US012724607B2

(12) United States Patent
Das et al.

(10) Patent No.: US 12,724,607 B2
(45) Date of Patent: Sep. 1, 2026

(54) AUTOMATED CODE DOCUMENTATION

(71) Applicant: Helix, Inc., San Mateo, CA (US)

(72) Inventors: William Das, New York, NY (US); Magnus Isaksson, Sunnyvale, CA (US)

(73) Assignee: Helix, Inc., San Mateo, CA (US)

( * ) Notice: Subject to any disclaimer, the term of this patent is extended or adjusted under 35 U.S.C. 154(b) by 386 days.

(21) Appl. No.: 18/429,167

(22) Filed: Jan. 31, 2024

(65) Prior Publication Data

US 2025/0245001 A1 Jul. 31, 2025

(51) Int. Cl.

*G06F 9/44* (2018.01)
*G06F 8/10* (2018.01)
*G06F 8/73* (2018.01)
*G06F 8/75* (2018.01)

(52) U.S. Cl.

CPC .................. *G06F 8/73* (2013.01); *G06F 8/10* (2013.01); *G06F 8/75* (2013.01)

(58) Field of Classification Search

CPC ..... G06F 8/10; G06F 8/75; G06F 8/71; G06F 8/20; G06F 8/73; G06F 8/36; G06F 8/70; G06F 8/41; G06F 8/60; G06F 8/77; G06F 8/433; G06F 11/3684; G06F 8/38; G06F 40/30; G06F 11/3604; G06F 11/3692; G06F 8/436; G06F 9/44505; G06F 16/951; G06F 8/425; G06F 8/37; G06N 20/00; G06N 3/08; G06N 5/04; G06N 7/01

See application file for complete search history.

(56) References Cited

U.S. PATENT DOCUMENTS

| | | | | |
|---|---|---|---|---|
| 6,691,192 B2 * | 2/2004 | Ajanovic | .............. | G06F 13/124 370/468 |
| 7,152,128 B2 * | 12/2006 | Wehage | ................ | G06F 13/124 710/305 |
| 11,163,543 B2 * | 11/2021 | Eyl | ......................... | G06F 8/315 |
| 2008/0114937 A1 * | 5/2008 | Reid | ................... | G06F 11/3636 710/22 |

OTHER PUBLICATIONS

Ctags; https://en.wikipedia.org/wiki/Ctags Jan. 29, 2024.
Tree of Thoughts; https://arxiv.org/abs/2305.10601; Dec. 2023.

* cited by examiner

*Primary Examiner* — Chuck O Kendall
(74) *Attorney, Agent, or Firm* — Duft & Bornsen, PC

(57) ABSTRACT

Apparatus and method of automatically documenting a codebase. In an embodiment, a mediator partitions a codebase comprising a plurality of software objects into subsets according to a hierarchical structure where software objects of higher layers have code dependencies with software objects of lower layers, submit the subsets of the software objects and context information for the software objects to a code documentation generator in phases starting with a lowest layer of the hierarchical structure, receive summaries of the software objects from the code documentation generator in each of the phases, and store the summaries as content for code documentation. The context information for the software objects submitted in a phase comprises one or more tags generated for the software objects, and one or more of the summaries generated in a prior phase.

20 Claims, 14 Drawing Sheets

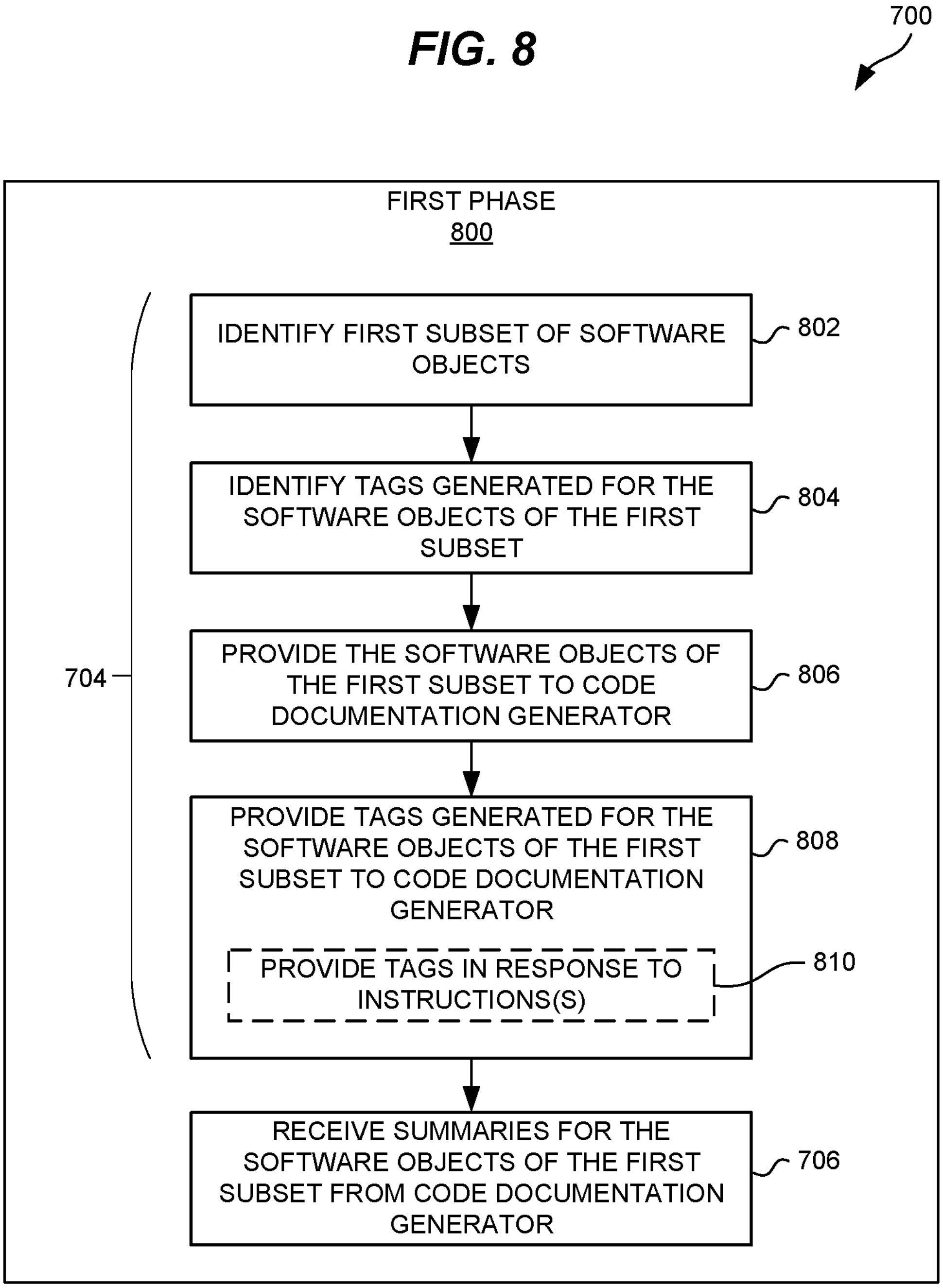

FIRST PHASE
800
IDENTIFY FIRST SUBSET OF SOFTWARE OBJECTS
802
IDENTIFY TAGS GENERATED FOR THE SOFTWARE OBJECTS OF THE FIRST SUBSET
804
PROVIDE THE SOFTWARE OBJECTS OF THE FIRST SUBSET TO CODE DOCUMENTATION GENERATOR
806
704
PROVIDE TAGS GENERATED FOR THE SOFTWARE OBJECTS OF THE FIRST SUBSET TO CODE DOCUMENTATION GENERATOR
808
PROVIDE TAGS IN RESPONSE TO INSTRUCTIONS(S)
810
RECEIVE SUMMARIES FOR THE SOFTWARE OBJECTS OF THE FIRST SUBSET FROM CODE DOCUMENTATION GENERATOR
706

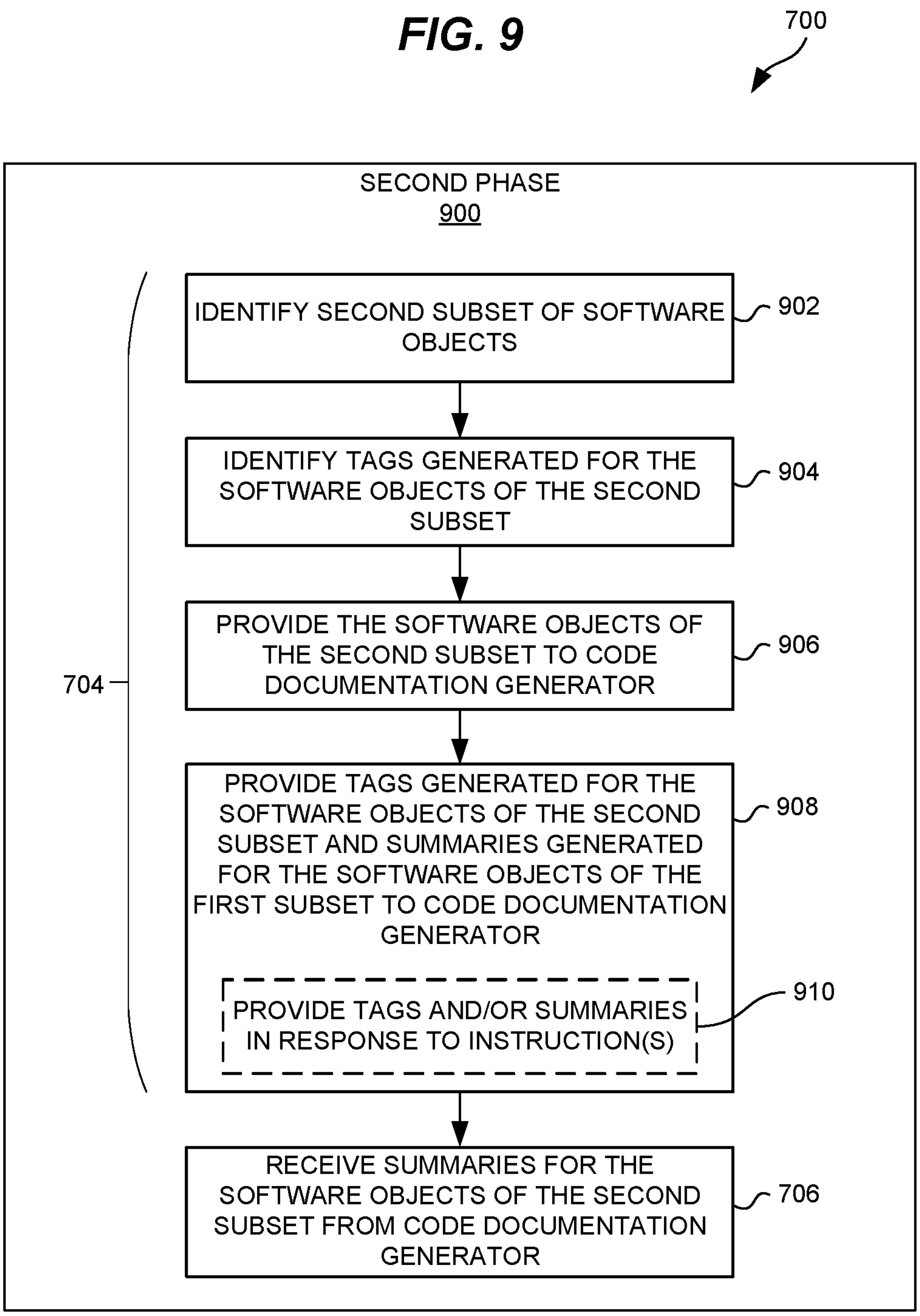

FIG. 9

SECOND PHASE
900

704

IDENTIFY SECOND SUBSET OF SOFTWARE OBJECTS — 902

IDENTIFY TAGS GENERATED FOR THE SOFTWARE OBJECTS OF THE SECOND SUBSET — 904

PROVIDE THE SOFTWARE OBJECTS OF THE SECOND SUBSET TO CODE DOCUMENTATION GENERATOR — 906

PROVIDE TAGS GENERATED FOR THE SOFTWARE OBJECTS OF THE SECOND SUBSET AND SUMMARIES GENERATED FOR THE SOFTWARE OBJECTS OF THE FIRST SUBSET TO CODE DOCUMENTATION GENERATOR — 908

PROVIDE TAGS AND/OR SUMMARIES IN RESPONSE TO INSTRUCTION(S) — 910

RECEIVE SUMMARIES FOR THE SOFTWARE OBJECTS OF THE SECOND SUBSET FROM CODE DOCUMENTATION GENERATOR — 706

FIG. 11

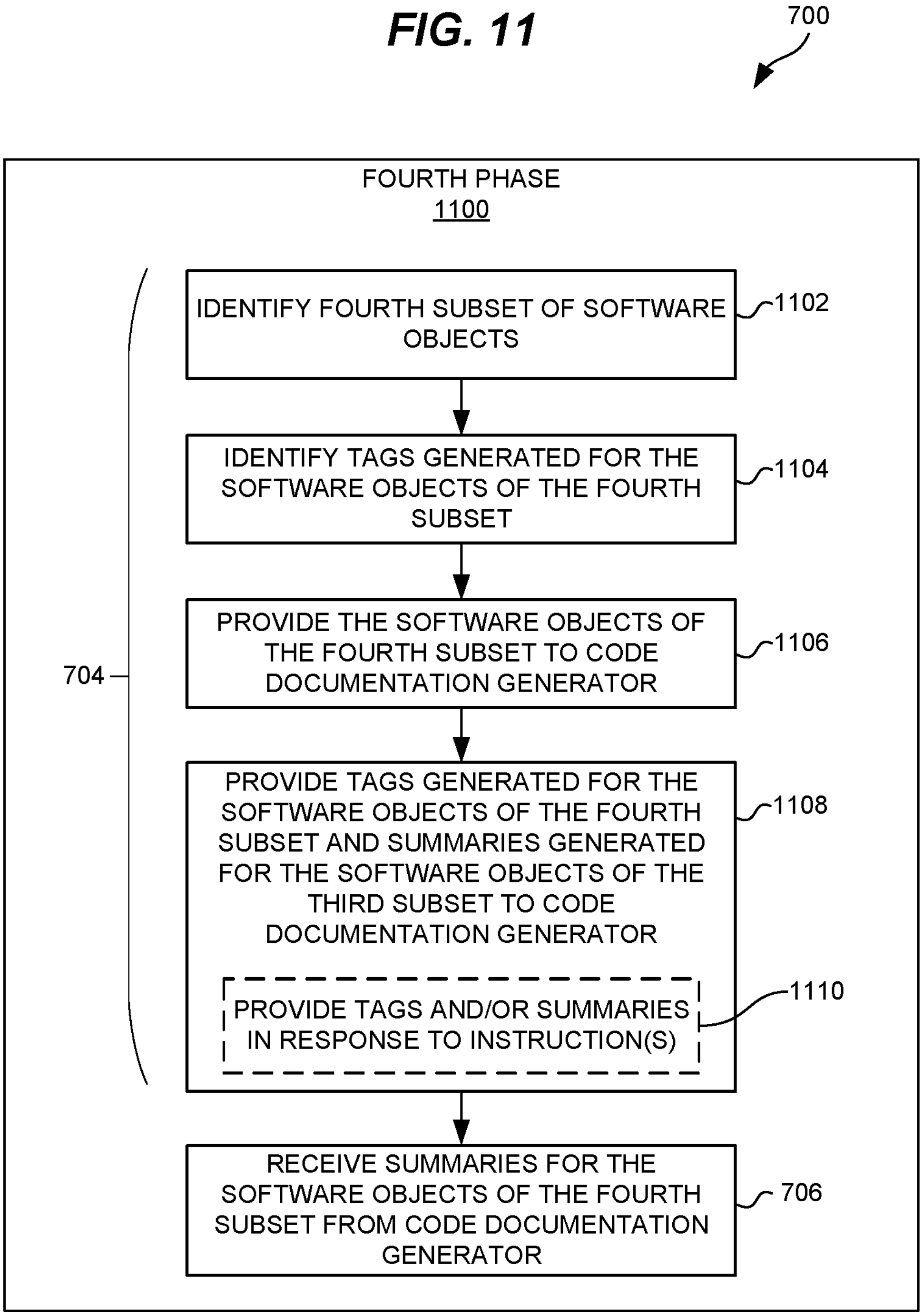

FOURTH PHASE
1100

IDENTIFY FOURTH SUBSET OF SOFTWARE OBJECTS — 1102

IDENTIFY TAGS GENERATED FOR THE SOFTWARE OBJECTS OF THE FOURTH SUBSET — 1104

PROVIDE THE SOFTWARE OBJECTS OF THE FOURTH SUBSET TO CODE DOCUMENTATION GENERATOR — 1106

PROVIDE TAGS GENERATED FOR THE SOFTWARE OBJECTS OF THE FOURTH SUBSET AND SUMMARIES GENERATED FOR THE SOFTWARE OBJECTS OF THE THIRD SUBSET TO CODE DOCUMENTATION GENERATOR — 1108

PROVIDE TAGS AND/OR SUMMARIES IN RESPONSE TO INSTRUCTION(S) — 1110

704

RECEIVE SUMMARIES FOR THE SOFTWARE OBJECTS OF THE FOURTH SUBSET FROM CODE DOCUMENTATION GENERATOR — 706

AUTOMATED CODE DOCUMENTATION

TECHNICAL FIELD

The following disclosure relates to the field of software development, and more particularly, to code documentation.

BACKGROUND

Programmers encounter difficulty managing, tracking, and reporting the capabilities of their software to users and/or regulators. For example, programmers may want or need to develop and maintain documentation that describes how their software operates in detail, such as to facilitate compliance with audit requirements. These difficulties are amplified when software changes over time to meet the changing needs of a customer base.

SUMMARY

Embodiments described herein provide an automated solution for generating code documentation for a codebase. As a general overview, an apparatus referred to as a mediator, is configured to interact with a code documentation generator, such as a Natural Language Processing (NLP) system. The mediator provides code segments (also referred to as software objects) of the codebase to the code documentation generator, along with context information for the code segments. The code documentation generator is configured to generate summaries of the code segments based on the context information. The summaries of the code segments may be used as content for the code documentation. One technical benefit is a codebase can be quite large making it impractical to document manually, and automated code documentation allows for the code documentation to be generated quickly and efficiently. Another technical benefit is the code documentation is more accurate based on the context information provided to the code documentation generator.

In an embodiment, an apparatus comprises a mediator communicatively coupled to a code documentation generator. The mediator comprises a processor and memory, and the processor is configured to partition the codebase comprising a plurality of software objects into subsets according to a hierarchical structure where the software objects of higher layers have code dependencies with the software objects of lower layers, submit the subsets of the software objects and context information for the software objects to the code documentation generator in phases starting with a lowest layer of the hierarchical structure, receive summaries of the software objects from the code documentation generator in each of the phases, and store the summaries as content for the code documentation. The context information for the software objects submitted in a phase comprises one or more tags generated for the software objects, and one or more of the summaries generated in a prior phase.

In an embodiment, a method of automatically documenting a codebase comprises partitioning the codebase comprising a plurality of software objects into subsets according to a hierarchical structure where the software objects of higher layers have code dependencies with the software objects of lower layers, submitting the subsets of the software objects and context information for the software objects to a code documentation generator in phases starting with a lowest layer of the hierarchical structure, receiving summaries of the software objects from the code documentation generator in each of the phases, and storing the summaries as content for code documentation. The context information for the software objects submitted in a phase comprises one or more tags generated for the software objects, and one or more of the summaries generated in a prior phase Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

FIGS. 7-11 are flow charts illustrating a method of automatically documenting a codebase in an illustrative embodiment.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
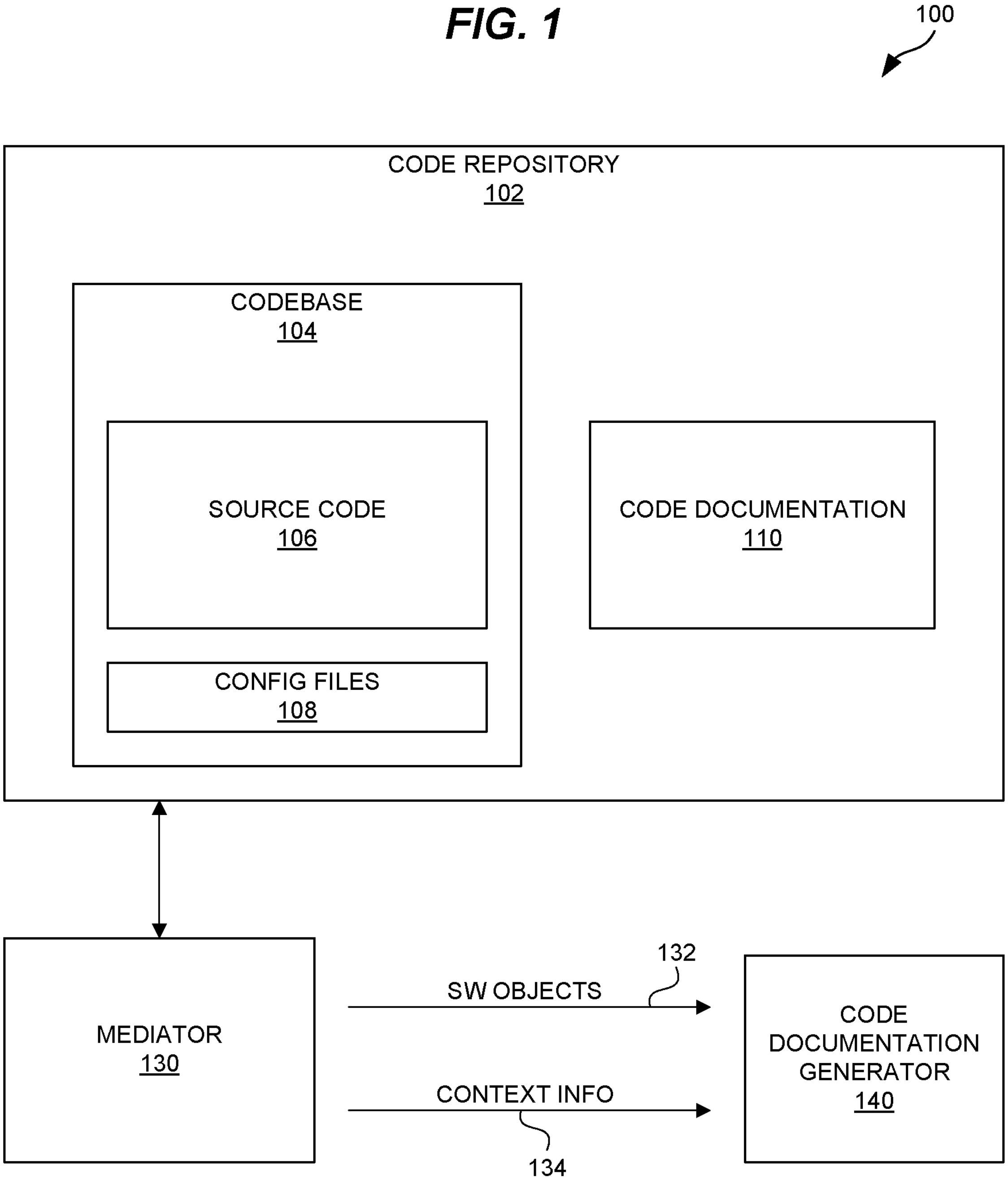
FIG. 1 is a block diagram of a code documentation architecture in an illustrative embodiment.

FIG. 1 is a block diagram of a code documentation architecture 100 in an illustrative embodiment. Code documentation architecture 100 comprises a collection of systems and/or components that provide an automated solution for generating code documentation 110 for a codebase 104. Code documentation architecture 100 includes a code repository 102, which is a storage location for a codebase 104 and/or other software development assets. Code repository 102 may be hosted locally on a server, on network-attached storage, remotely on a cloud platform, etc. Using code repository 102, software developers may be able to track and/or manage modifications made to codebase 104, roll back to previous versions of the codebase 104, collaborate with other software developers or programmers, etc.

A codebase 104 comprises a complete body of source code 106 for a software program, component, or system. For example, the codebase 104 includes the source files used to compile the software into machine code, including configuration files 108. Code documentation 110 is a collection of documents and/or code comments explaining or describing a codebase 104 (e.g., how code works, how to use the code, the purpose of the code, etc.). Code documentation 110 may be generated to enhance code readability, reproducibility, usability, etc., for quality and/or compliance submissions to regulatory agencies, governmental agencies, etc., and/or for other reasons. The format and content of code documentation 110 may vary as desired. For example, code documentation 110 may comprise one or more files in a structured format, such as a HyperText Markup Language (HTML) file, a Portable Document Format (PDF) file, etc.

In an embodiment, code documentation architecture 100 further comprises a mediator 130 communicatively coupled to a code documentation generator 140. Code documentation generator 140 is a system or tool configured to automatically generate content for software or code documentation 110. Mediator 130 comprises a system, server, device, apparatus, equipment (including hardware), means, etc., configured to assist, facilitate, or support automated code documentation of a codebase. In an embodiment, mediator 130 may be communicatively coupled to the code documentation generator 140 over a communication network. The communication network may comprise a Wide Area Network (WAN), such as the Internet, a telecommunications network, an enterprise network or private network, a Wireless Local Area Network (WLAN), etc., or any combination thereof. Mediator 130 may be communicatively coupled to code repository 102 over a local network or bus, via a communication network, etc.

As a general overview of an automated code documentation process, mediator 130 is configured to provide blocks of code from codebase 104, referred to herein generally as software objects 132, to code documentation generator 140. Code documentation generator 140 is configured to generate summaries of the software objects 132, which may be used as content for the code documentation 110. Although code documentation generator 140 is configured to automatically generate the summaries, it may lack context or detail that results in inaccuracies. Thus, mediator 130 is configured to mediate interactions between a codebase 104 and code documentation generator 140, and to provide context information 134 to code documentation generator 140 when generating the summaries. One technical benefit is the accuracy of the output from the code documentation generator 140 may be improved by submission of the context information 134.

Figure 2:
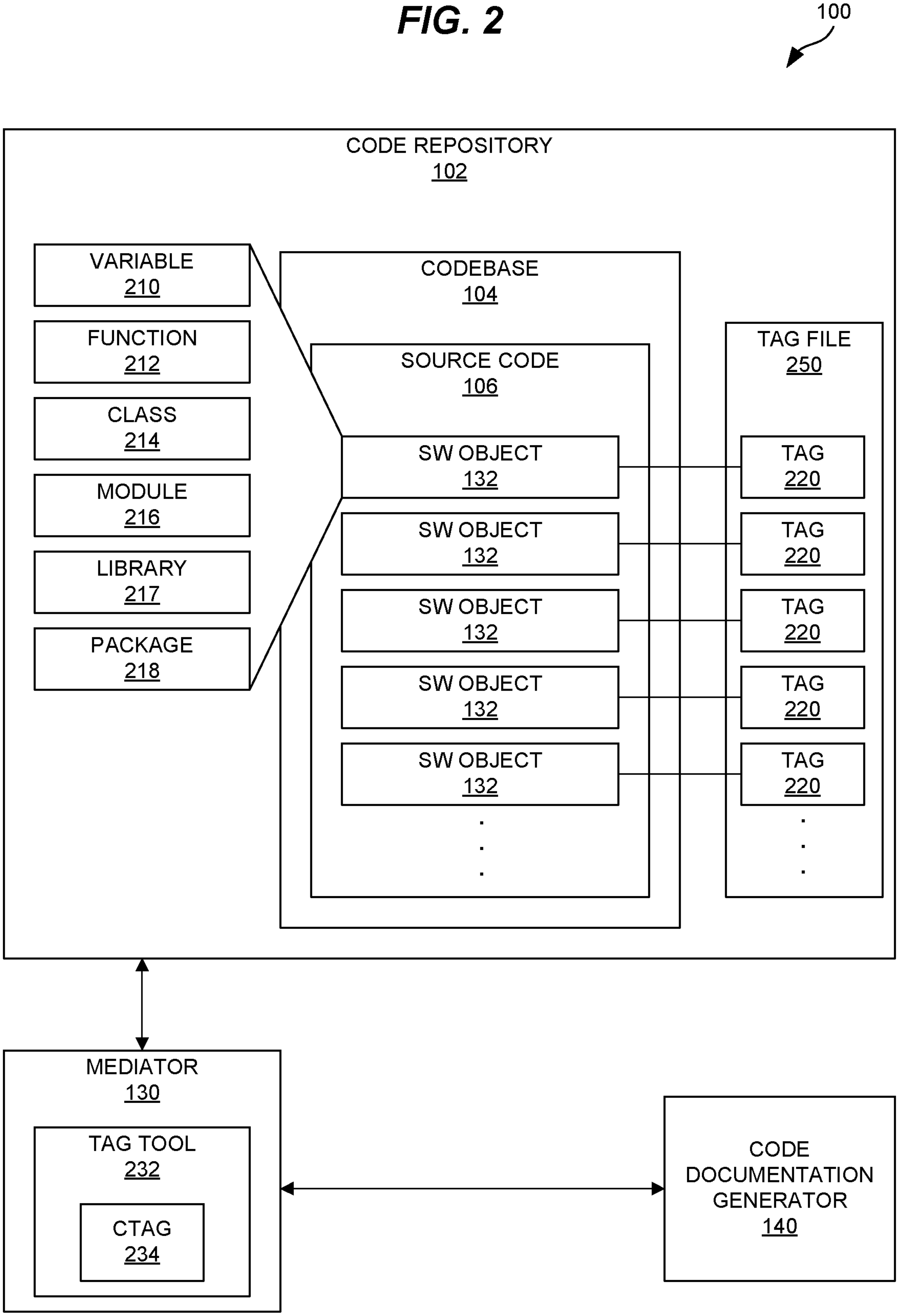
FIG. 2 is a block diagram of a code documentation architecture in an illustrative embodiment.

FIG. 2 is a block diagram of code documentation architecture 100 in an illustrative embodiment. Codebase 104 comprises a plurality of software objects 132, such as within the source code 106. A software object 132 (also referred to as a software unit, a code segment, etc.) is a piece, section, block, or portion of software/code defined within codebase 104. The term "software object" is language-agnostic, and refers generally to a subdivision of software or block of code having explicitly-defined boundaries within the code itself (e.g., demarcated by separators such as parentheses, braces, line breaks, etc.). A software object 132 may be associated with a particular software object type. For example, a software object 132 may comprise a variable 210, a function 212 (or method), a class 214, etc. A variable 210 comprises a block of code for defining or storing a data value. A variable 210 may have different data types, such as integer, character, string, Boolean, floating point number, etc. A function 212 comprises a block of code that runs when called to perform a task, action, or operation (i.e., define the code once, and use it many times). A function 212 may be passed data, referred to as parameters, which may comprise one or more variables 210. A class 214 is a block of code comprising a combination of variables 210, functions 212, and/or other software objects 132. Other examples of a software object 132 may be a module 216, a library 217, a package 218, etc. A module 216, library 217, and package 218 each refer to a block of code comprising a combination of variables 210, functions 212, classes 214, and/or other software objects 132.

In an embodiment, mediator 130 may be configured to index or tag the software objects 132 in codebase 104. For example, mediator 130 may implement or command a tag tool 232 configured to generate one or more tag files 250 (also referred to as an index file) for source code 106 (or configuration files 108). One example of a tag tool 232 is a Ctag tool 234. Mediator 130 may run the tag tool 232 on codebase 104 to generate the tag file 250. In general, a tag file 250 provides a description or definition of software objects 132. The tag file 250 may include a list of tags 220 each associated with a software object 132. A tag 220 (also referred to as tag information or tag data) may include a name or identifier of the software object 132, a name of the file where the software object 132 is defined, a location of the software object 132 in the file (e.g., line number), etc. In an example, the Ctag tool 234 may run to generate a tag file 250 comprising a plurality or collection of Ctags (e.g., tags 220). The assemblage of Ctags, otherwise referred to as an index, optimizes the navigation process within intricate source code by delivering a searchable database populated with function definitions, variables, classes, and a myriad of other identifiers. A Ctag's contents comprise the identifier's denomination and location, specifically the file path and line number, which serve as navigational aids to pinpoint the precise position within the source file. Depending on the language employed in the source code, the Ctag may incorporate supplementary data, such as the structure's hierarchy or scope. A Ctag index is particularly useful in large-scale software projects where code navigation can become exceedingly hard, for example, navigations from declaration to definition. One technical benefit is a tag file 250 allows for quick and easy navigation of a large codebase 104, as text editors, code search engines, and/or other utilities can search the codebase 104 based on the tag file 250. Although mediator 130 is shown as implementing a tag tool 232, it is understood that another system may implement the tag tool 232 to generate the tag file 250 for codebase 104 in other embodiments.

Figure 3:
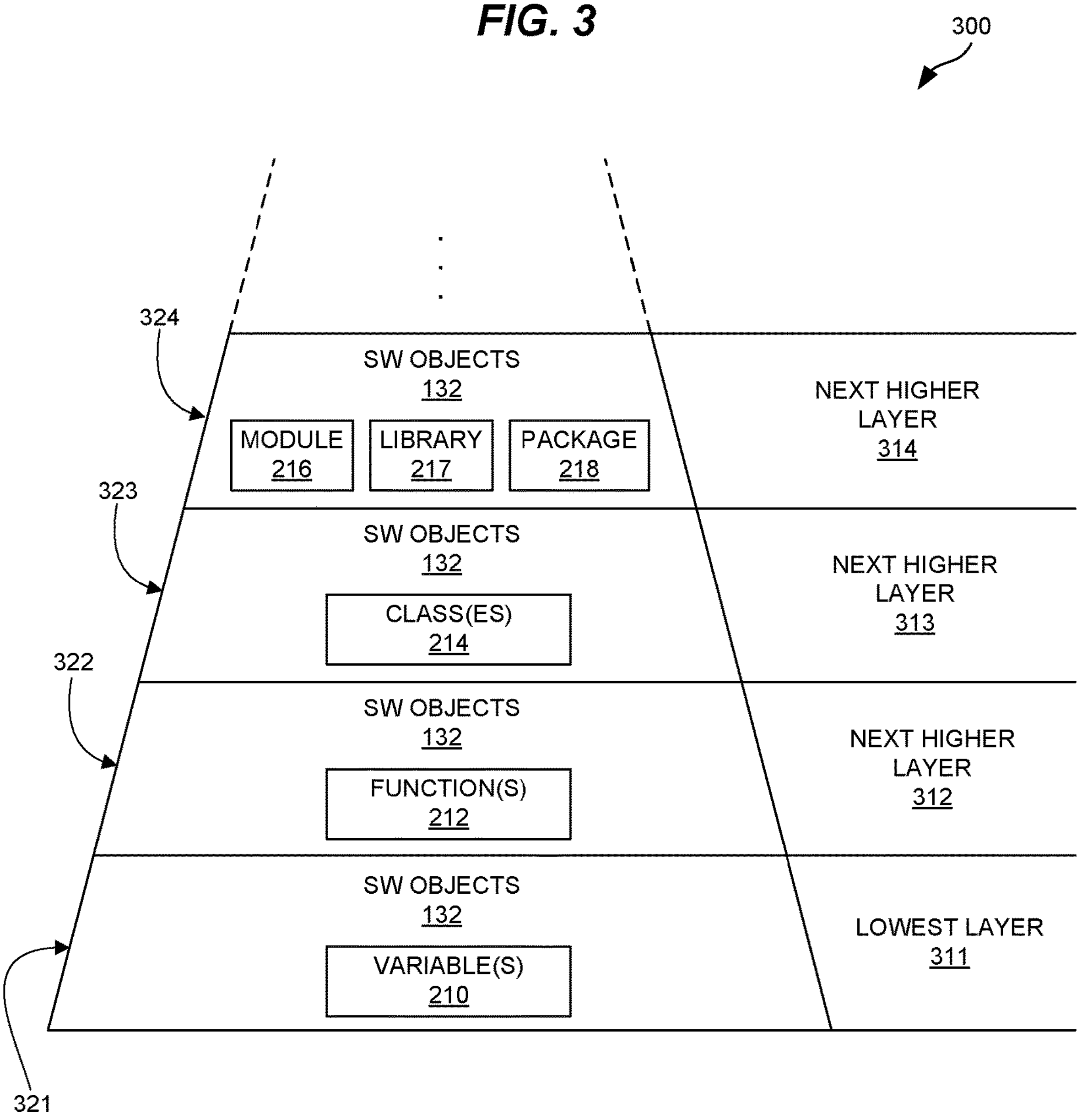
FIG. 3 is a block diagram illustrating a hierarchical structure of a codebase in an illustrative embodiment.

In an embodiment, the software objects 132 of codebase 104 may be classified or arranged as a layered or tiered hierarchy. FIG. 3 is a block diagram illustrating a hierarchical structure 300 of a codebase 104 in an illustrative embodiment. In this embodiment, hierarchical structure 300 (or hierarchical architecture) includes multiple layers 311-314 of software objects 132. In hierarchical structure 300, code dependencies may exist between software objects 132 of the different layers 311-314. In programming, code dependency refers to one piece of code relying on another piece of code for correct functionality. Code dependencies move from top to bottom in hierarchical structure 300. Thus, software objects 132 of higher layers may have dependencies that refer to software objects 132 of lower layers. At the same time, software objects 132 of lower layers may have no knowledge (i.e., no dependencies) of software objects 132 of higher layers. Thus, the software objects 132 may be decomposed into logical groups or subsets at different layers 311-314 in the hierarchy. The different layers 311-314 may be associated with different software object types 321-324, such as variable 210, function 212 (or method), class 214, module 216, library 217, package 218, etc.

In an embodiment, hierarchical structure 300 includes a lowest layer 311 and one or more upper or higher layers 312-314. The lowest layer 311 of the hierarchical structure 300 comprises software objects 132 of a first software object type 321 that do not have code dependencies with software objects 132 associated with higher layers 312-314. Stated another way, the software objects 132 of the lowest layer 311 have no knowledge of the software objects 132 associated with the higher layers 312-314, and do not call or reference the software objects 132 associated with the higher layers 312-314. One example of the software objects 132 of the first software object type 321 are variables 210.

The first higher layer 312 of the hierarchical structure 300, adjacent to the lowest layer 311, comprises one or more software objects 132 of a second software object type 322 having code dependencies with one or more of the software objects 132 associated with the lowest layer 311. The software objects 132 of the first higher layer 312 have no knowledge of the software objects 132 associated with higher layers 313-314, and do not call or reference the software objects 132 associated with higher layers 313-314. One example of the software objects 132 of the second software object type 322 are functions 212.

The second higher layer 313 of the hierarchical structure 300, adjacent to the first higher layer 312, comprises one or more software objects 132 of a third software object type 323 having code dependencies with one or more of the software objects 132 associated with the lowest layer 311 and/or the first higher layer 312. The software objects 132 of the second higher layer 313 have no knowledge of the software objects 132 associated with higher layer 314, and do not call or reference the software objects 132 associated with higher layer 314. One example of the software objects 132 of the third software object type 323 are classes 214.

The third higher layer 314 of the hierarchical structure 300, adjacent to the second higher layer 313, comprises one or more software objects 132 of a fourth software object type 324 having code dependencies with one or more of the software objects 132 associated with the lowest layer 311, the first higher layer 312, and/or the second higher layer 313. The software objects 132 of the third higher layer 314 have no knowledge of the software objects 132 associated with higher layers (if existing), and do not call or reference the software objects 132 associated with higher layers. One example of the software objects 132 of the fourth software object type 324 are modules 216, libraries 217, packages 218, etc.

Hierarchical structure 300 may have additional higher layers depending on the programming language. Also, the logical groups of the software objects 132 at the different layers 311-314 may vary from what is illustrated in FIG. 3.

Figure 4:
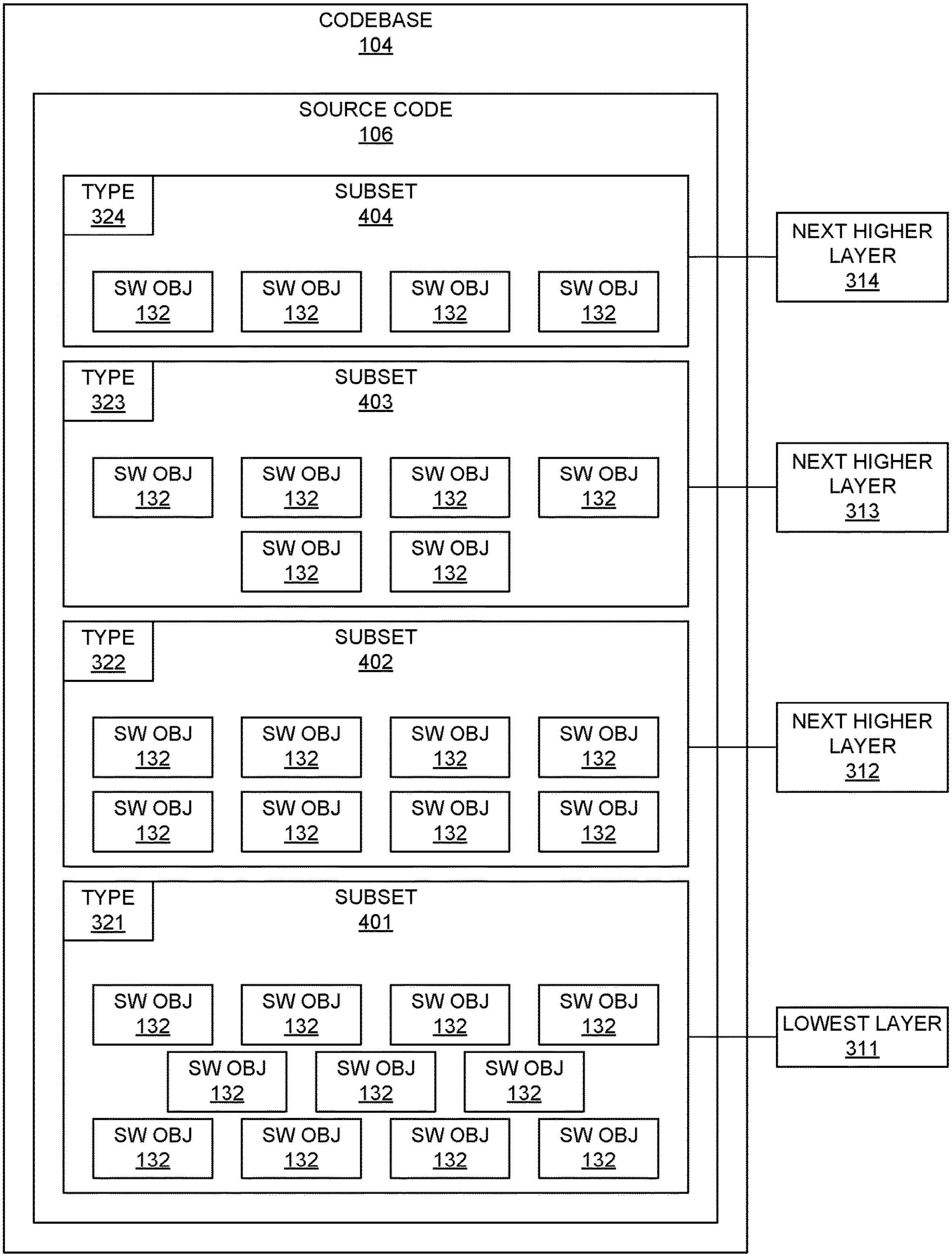
FIG. 4 is a block diagram illustrating a codebase partitioned in an illustrative embodiment.

In an embodiment, mediator 130 is configured to partition, subdivide, or segment the codebase 104 into subsets or groups of the software objects 132, such as based on the layered hierarchy and/or software object type. FIG. 4 is a block diagram illustrating a codebase 104 partitioned in an illustrative embodiment. Mediator 130 is configured to partition the codebase 104 into logical groupings or subsets 401-404 of software objects 132 based on the layered hierarchy and/or according to the software object types 321-324. These groupings may be created based on a prompt size limit for code documentation generator 140. This may include adding as many software objects 132 into a grouping as fit into the prompt size limit. In an example, mediator 130 partitions the codebase 104 into a first subset 401 of software objects 132 associated with the lowest layer 311 (i.e., of a first software object type 321, such as variables 210) of the hierarchical structure 300. Mediator 130 partitions the codebase 104 into a second subset 402 of software objects 132 associated with the first higher layer 312 (i.e., of a second software object type 322, such as functions 212) of the hierarchical structure 300. Mediator 130 partitions the codebase 104 into a third subset 403 of software objects 132 associated with the second higher layer 313 (i.e., of a third software object type 323, such as classes 214) of the hierarchical structure 300. Mediator 130 partitions the codebase 104 into a fourth subset 404 of software objects 132 associated with the third higher layer 314 (i.e., of a fourth software object type 324, such as modules 216, libraries 217, packages 218, etc.) of the hierarchical structure 300.

With the codebase 104 partitioned into subsets 401-404, mediator 130 is configured to submit the subsets 401-404 of software objects 132 to code documentation generator 140 in phases. For example, mediator 130 may submit the first subset 401 of software objects 132 associated with the lowest layer 311 in a first phase, submit the second subset 402 of software objects 132 associated with the first higher layer 312 in a second phase, submit the third subset 403 of software objects 132 associated with the second higher layer 313 in a third phase, etc. Along the way, mediator 130 also submits context information 134 for the software objects 132 to code documentation generator 140, which is described in further detail below.

Figure 5:
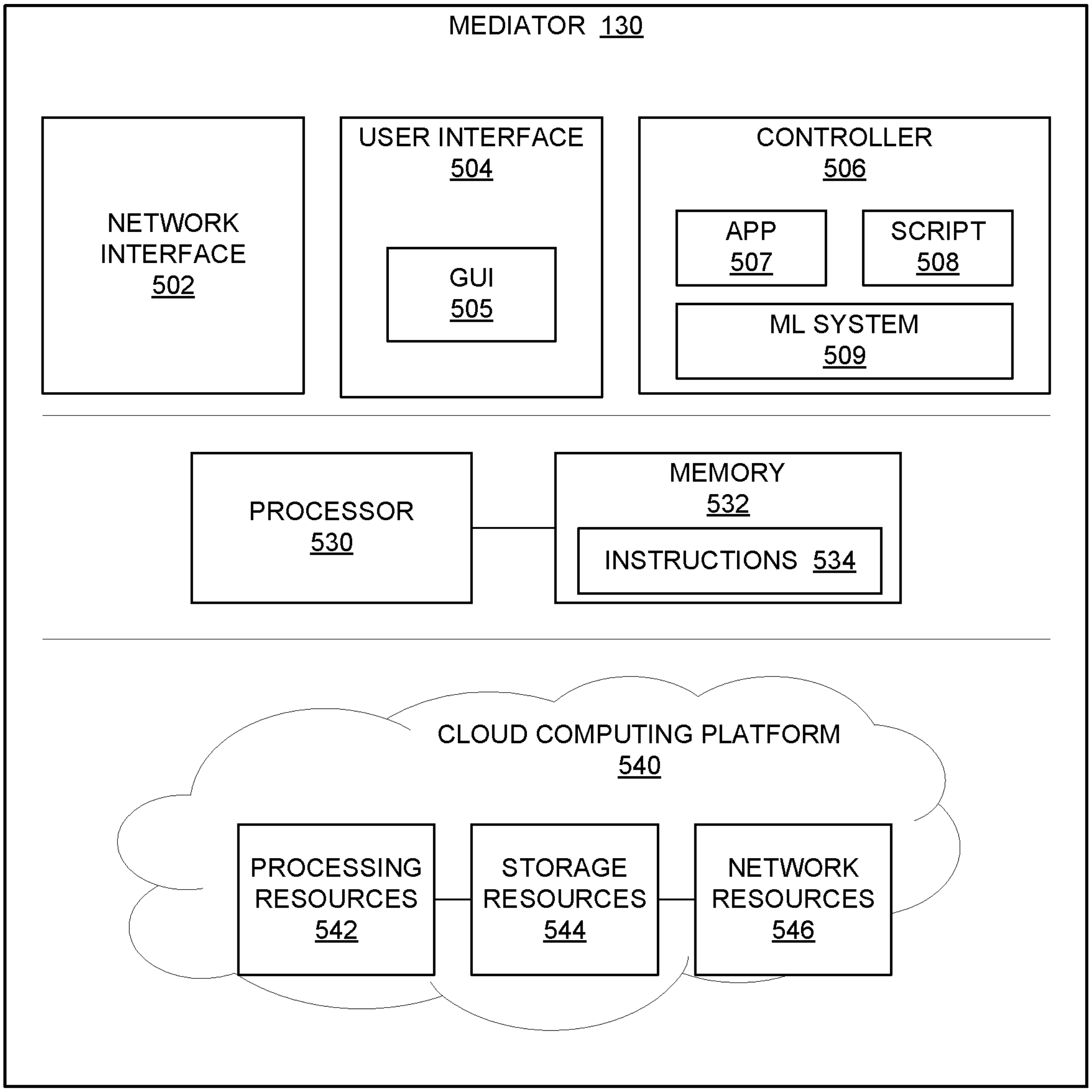
FIG. 5 is a block diagram of a mediator in an illustrative embodiment.

FIG. 5 is a block diagram of mediator 130 in an illustrative embodiment. In this embodiment, mediator 130 includes the following subsystems: a network interface component 502, a user interface component 504, and a controller 506. Network interface component 502 is a hardware component or circuitry that communicates with external devices, systems, or entities. For example, network interface component 502 may communicate with code repository 102 and/or code documentation generator 140 over a network. Network interface component 502 may transmit or receive data over a wide area network connection (e.g., via the internet), such as via a messaging protocol, email, a file transfer protocol, an Application Programming Interface (API), etc. Network interface component 502 may transmit or receive data over a local area network connection, a local bus, etc.

User interface component 504 may comprise circuitry, logic, hardware, means, etc., configured to interact with an end user. For example, user interface component 504 may include a display, screen, touch screen, or the like (e.g., a Liquid Crystal Display (LCD), a Light Emitting Diode (LED) display, etc.). User interface component 504 may include a keyboard or keypad, a tracking device (e.g., a trackball or trackpad), a speaker, a microphone, etc. User interface component 504 may provide a Graphical User Interface (GUI) 505, portal, etc., configured to display information to an end user, such as through a display. User interface component 504 may also receive input, commands, etc., from an end user.

Controller 506 may comprise circuitry, logic, hardware, means, etc., configured to perform one or more actions or tasks to assist or support code documentation generator 140 in generating content for the code documentation 110. Controller 506 may execute an application 507 or script 508 to perform one or more actions or tasks, and/or may implement one or more machine learning (ML) systems 509 to perform one or more actions or tasks.

One or more of the subsystems of mediator 130 may be implemented on a hardware platform comprised of analog and/or digital circuitry. For example, controller 506 may be implemented on one or more processors 530 that execute instructions 534 (i.e., computer readable code) for software that are loaded into memory 532. A processor 530 comprises an integrated hardware circuit configured to execute instructions 534 to provide the functions of mediator 130. Processor 530 may comprise a set of one or more processors or may comprise a multi-processor core, depending on the particular implementation. Memory 532 is a non-transitory computer readable storage medium for data, instructions, applications, etc., and is accessible by processor 530. Memory 532 is a hardware storage device capable of storing information on a temporary basis and/or a permanent basis. Memory 532 may comprise a random-access memory, or any other volatile or non-volatile storage device.

One or more of the subsystems of mediator 130 may be implemented on cloud computing platform 540 (e.g., Amazon Web Services (AWS), Google Cloud, Microsoft Azure, etc.) or another type of processing platform. Cloud resources provisioned on cloud computing platform 540 may comprise processing resources 542 (e.g., physical or hardware processors, a server, a virtual server or virtual machine (VM), a virtual central processing unit (vCPU), etc.), storage resources 544 (e.g., physical or hardware storage, virtual storage, etc.), and/or networking resources 546, although other resources are considered herein. Mediator 130 may include additional components that are not shown for the sake of brevity.

Figure 6:
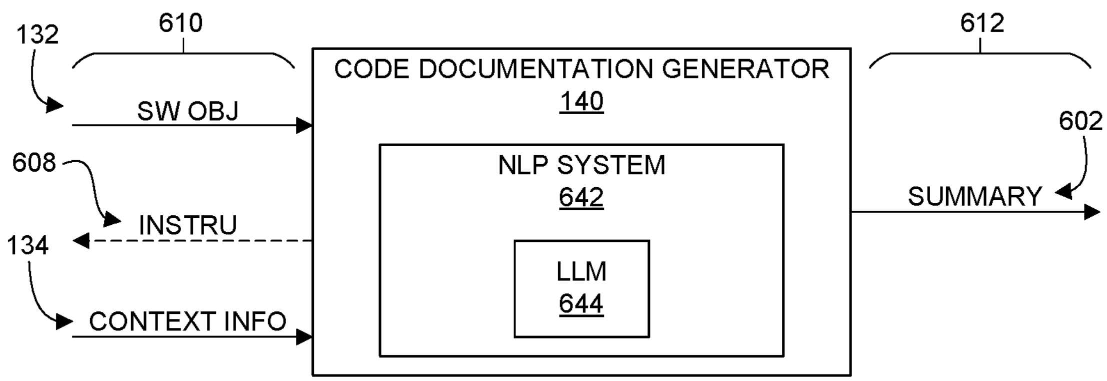
FIG. 6 is a block diagram of a code documentation generator in an illustrative embodiment.

FIG. 6 is a block diagram of code documentation generator 140 in an illustrative embodiment. Code documentation generator 140 may include one or more algorithms that analyze a codebase 104 to generate content for the code documentation 110. In an embodiment, code documentation generator 140 may comprise a natural language processing (NLP) system 642 or NLP model configured to analyze and/or interpret human language. For example, code documentation generator 140 may comprise or implement one or more Large Language Models (LLMs) 644. An LLM 644 is a type of deep learning algorithm (i.e., machine learning) that is trained to perform NLP tasks. An LLM 644 is based on a transformer model that receives input, encodes the input, and then decodes to encoded input to generate output (e.g., a prediction). In general, an LLM 644 is trained on a large corpus of textual data to learn the meaning of words, the relationships between words, etc. LLM 644 may be trained using self-supervised learning and/or semi-supervised learning.

In operation, code documentation generator 140 is configured to receive one or more software objects 132 (i.e., source code 106) as input 610. Code documentation generator 140 is also configured to receive context information 134 as input 610, which further characterizes the software object 132. In an embodiment, code documentation generator 140 may be configured to issue a prompt, request, query, or instruction 608 requesting additional information describing one or more of the software objects 132. For example, a plug-in, an API, or the like may be programmed to have NLP system 642 or LLM 644 query the mediator 130 for specific portions of context information 134 regarding one or more of the software objects 132. Based on the input 610, code documentation generator 140 is configured to perform a task of generating a summary 602 of the software object(s) 132 as output 612. The summary 602 is a natural language description of the software object(s) 132 (i.e., summary of the source code 106) that may be used as content for the code documentation 110 of the overall codebase 104. The summary 602 may be consistent with predefined criteria, standards, formats, etc.

FIGS. 7-11 are flow charts illustrating a method 700 of automatically documenting a codebase 104 in an illustrative embodiment. Method 700 is described with reference to mediator 130, although the method 700 may be performed by other systems in other embodiments. The steps of the flow charts described herein are not all inclusive and may include other steps not shown, and the steps may be performed in an alternative order.

Figure 7:
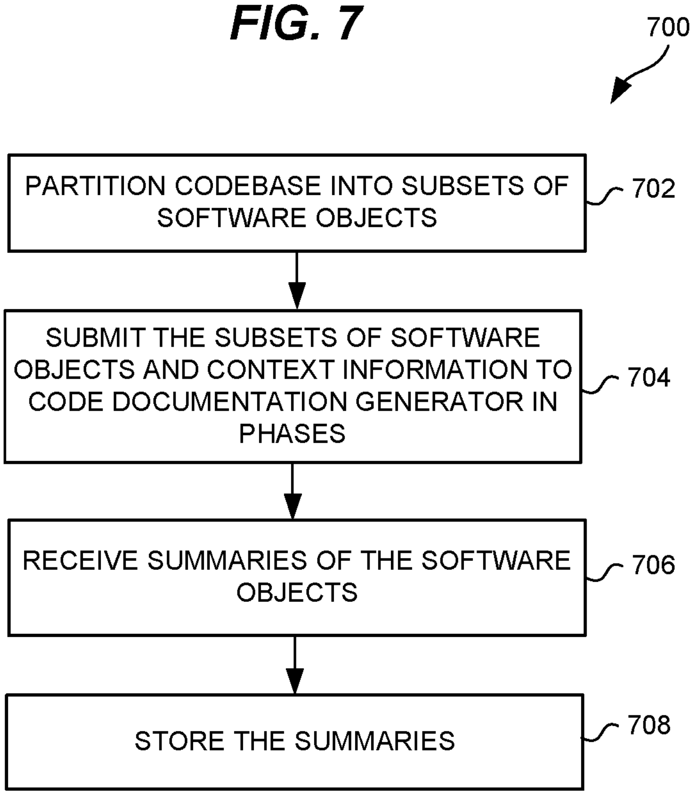

In FIG. 7, controller 506 of mediator 130 partitions the codebase 104 into subsets 401-404 of software objects 132 (step 702). As described above, codebase 104 may be decomposed into logical groups or subsets at different layers 311-314 of a hierarchical structure 300, according to different software object types 321-324, etc. Thus, controller 506 subdivides the codebase 104 into subsets 401-404 based on a hierarchy, based on software object type, etc. Controller 506 submits, transfers, or provides the subsets 401-404 of software objects 132 to code documentation generator 140 (step 704), such as through network interface component 502, to generate summaries 602 of the software objects 132. Controller 506 also provides context information 134 for the software objects 132 to code documentation generator 140 to generate the summaries 602. In an embodiment, controller 506 is configured to submit the subsets 401-404 and associated context information 134 to code documentation generator 140 in phases or stages. For example, controller 506 may submit the subsets 401-404 in phases starting with the subset 401 of software objects 132 associated with the lowest layer 311 of the hierarchical structure 300. Controller 506 may then submit the subset 402 associated with the next higher layer 312 of the hierarchical structure 300, followed by the subset 402 associated with the next higher layer 313, and so on. Controller 506 receives the summaries 602 of the software objects 132 from code documentation generator 140 (step 706), such as through network interface component 502. Thus, during each individual phase, controller 506 receives summaries 602 of the software objects 132 submitted during that phase. Controller 506 then stores the summaries 602 (step 708), which may be used as content for the code documentation 110.

In an embodiment, the context information 134 provided from mediator 130 to code documentation generator 140 may comprise one or more tags 220 generated for the software objects 132, and/or may comprise one or more summaries 602 generated in a prior phase. For example, mediator 130 may submit the subset 401 of software objects 132 associated with the lowest layer 311 of the hierarchical structure 300 (e.g., variables 210) to code documentation generator 140 in a first phase, along with one or more tags 220 for these software objects 132 (there are no prior summaries, as this is the first phase). In response, mediator 130 receives summaries 602 of the software objects 132 in subset 401 from code documentation generator 140. Next, mediator 130 may submit the subset 402 of software objects 132 associated with the next higher layer 312 of the hierarchical structure 300 (e.g., functions 212) to code documentation generator 140 in a second phase following the first phase, along with one or more tags 220 for these software objects 132 and one or more summaries 602 generated in the first phase. In response, mediator 130 receives summaries 602 of the software objects 132 in subset 402 from code documentation generator 140. Next, mediator 130 may submit the subset 403 of software objects 132 associated with the next higher layer 313 of the hierarchical structure 300 (e.g., classes 214) to code documentation generator 140 in a third phase following the second phase, along with one or more tags 220 for these software objects 132 and one or more summaries 602 generated in the second phase. In response, mediator 130 receives summaries 602 of the software objects 132 in subset 403 from code documentation generator 140. One technical benefit is the summaries 602 of lower-layer software objects 132 may be used as context information 134 for higher-layer software objects 132 to improve the quality of the summaries 602. Higher-layer software objects 132, such as classes 214, may be lengthy, detailed, and complex, which may pose a challenge for code documentation generator 140. By providing previously-generated summaries 602 for the lower-layer software objects 132 as context information 134, code documentation generator 140 can more effectively and accurately generate the summaries 602 for the higher-layer software objects 132.

Figure 12:
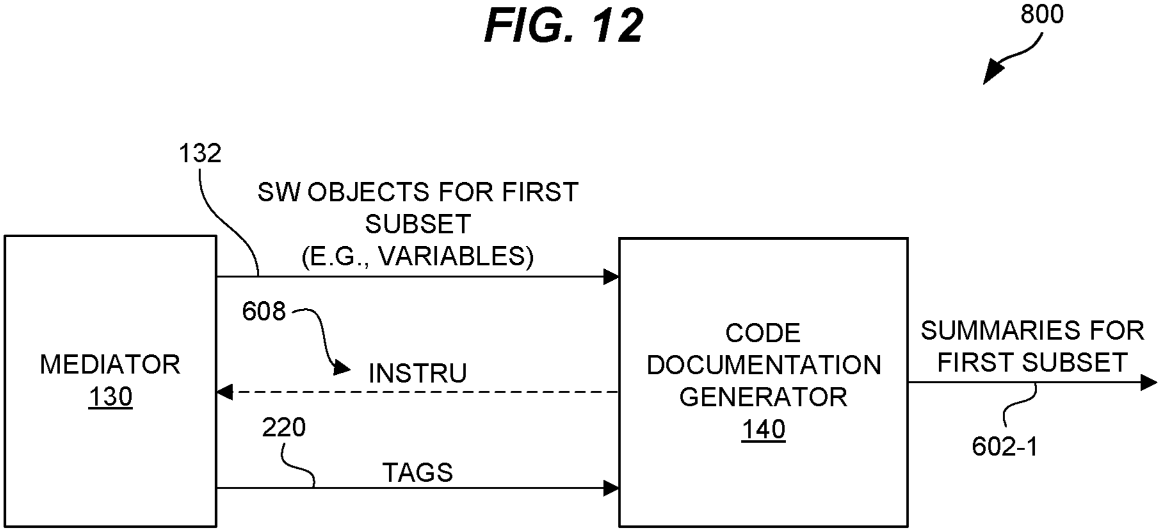
FIG. 12 is a block diagram illustrating data exchange between a mediator and a code documentation generator for the first phase in an illustrative embodiment.

FIGS. 8-11 illustrate phases for providing the subsets 401-404 of the software objects 132 to code documentation generator 140. FIG. 8 illustrates a first phase 800, where controller 506 identifies (step 802) a first subset 401 of software objects 132 associated with the lowest layer 311 of the hierarchical structure 300, associated with a first software object type 321, etc. For example, the software objects 132 of the first subset 401 may comprise variables 210 defined in codebase 104. Controller 506 also identifies tags 220 generated for the software objects 132 of the first subset 401 (step 804). Controller 506 provides the software objects 132 of the first subset 401 to code documentation generator 140 (step 806). For example, controller 506 sends, transfers, or otherwise provides the source code 106 for the software objects 132 of the first subset 401 to code documentation generator 140. Controller 506 may provide the source code 106 for individual software objects 132 of the first subset 401 to code documentation generator 140 (e.g., one at a time), may provide the source code 106 for a batch or batches of software objects 132, etc. FIG. 12 is a block diagram illustrating data exchange between mediator 130 and code documentation generator 140 for the first phase 800 in an illustrative embodiment. In FIG. 12, mediator 130 provides the software objects 132 of the first subset 401 (e.g., variables 210) to code documentation generator 140.

In FIG. 8, controller 506 also provides context information 134 for one or more software objects 132 of the first subset 401 to code documentation generator 140. To do so, controller 506 provides the tags 220 generated for one or more of the software objects 132 of the first subset 401 to code documentation generator 140 (step 808). In FIG. 12, mediator 130 provides the tags 220 to code documentation generator 140 as context information 134 for the software objects 132 of the first subset 401. In an embodiment, controller 506 may provide the tags 220 and the software objects 132 (e.g., source code 106) jointly or collectively, such as in a bundle or combined submission to code documentation generator 140. In another embodiment, controller 506 may first provide the software objects 132 of the first subset 401 to code documentation generator 140, and wait for one or more instructions 608 from code documentation generator 140. For example, mediator 130 may instruct code documentation generator 140 to write a summary 602 for specific software objects 132, and code documentation generator 140 may request clarifications in the form of one or more tags 220 for one or more elements/sub-objects within the original software objects 132 to complete the task. Thus, code documentation generator 140 may query mediator 130 to provide a specific set of tags 220 based on what the code documentation generator 140 needs to complete the task. As an example, code documentation generator 140 may prepare and send a JavaScript Object Notation (JSON) file (or another type of text file) indicating software objects 132 that are not declared within the original software object 132 submitted. If/when code documentation generator 140 issues an instruction 608 (or series of instructions) for additional information regarding the software objects 132 of the first subset 401, controller 506 may provide the tags 220 that correspond with those software objects 132 in response to the instruction 608 (optional step 810 of FIG. 8). For example, mediator 130 may process the JSON file received from code documentation generator 140, and provide the information as a list of tags 220, if found.

In response to the submission by mediator 130, code documentation generator 140 generates summaries 602-1 for the software objects 132 of the first subset 401 based at least in part on the context information 134 provided by mediator 130. In FIG. 8, controller 506 receives the summaries 602-1 for the software objects 132 of the first subset 401 from code documentation generator 140 (step 706). Controller 506 may store the summaries 602-1 in local memory and/or in code repository 102. One technical benefit is the summaries 602-1 for the software objects 132 of the first subset 401 (e.g., variables 210) are automatically generated by code documentation generator 140, and may be used as content for the code documentation 110 of the codebase 104. Another technical benefit is mediator 130 provides context information 134 to code documentation generator 140 in the form of tags 220 to improve accuracy of the summaries 602-1.

Figure 13:
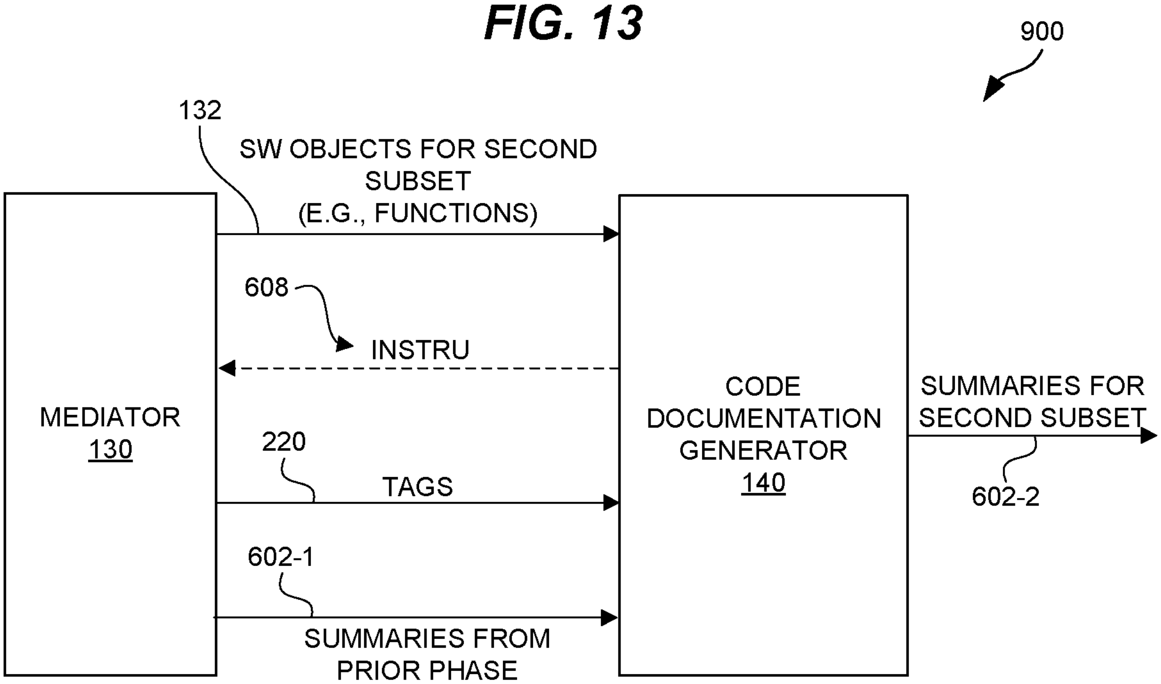
FIG. 13 is a block diagram illustrating data exchange between a mediator and a code documentation generator for the second phase in an illustrative embodiment.

FIG. 9 illustrates a second phase 900, where controller 506 identifies (step 902) a second subset 402 of software objects 132 associated with the first higher layer 312 of the hierarchical structure 300, associated with a second software object type 322, etc. For example, the software objects 132 of the second subset 402 may comprise functions 212 defined in codebase 104. Controller 506 also identifies tags 220 generated for the software objects 132 of the second subset 402 (step 904). Controller 506 provides the software objects 132 of the second subset 402 to code documentation generator 140 (step 906). For example, controller 506 sends, transfers, or otherwise provides the source code 106 for the software objects 132 of the second subset 402 to code documentation generator 140. Controller 506 may provide the source code 106 for individual software objects 132 of the second subset 402 to code documentation generator 140 (e.g., one at a time), may provide the source code 106 for a batch or batches of software objects 132, etc. FIG. 13 is a block diagram illustrating data exchange between mediator 130 and code documentation generator 140 for the second phase 900 in an illustrative embodiment. In FIG. 13, mediator 130 provides the software objects 132 of the second subset 402 (e.g., functions 212) to code documentation generator 140.

In FIG. 9, controller 506 also provides context information 134 for one or more software objects 132 of the second subset 402 to code documentation generator 140. To do so, controller 506 provides the tags 220 generated for one or more of the software objects 132 of the second subset 402, and also provides the summaries 602-1 generated in a prior phase for one or more of the software objects 132 of the first subset 401, to code documentation generator 140 (step 908). In FIG. 13, mediator 130 provides the tags 220 to code documentation generator 140 and summaries 602-1 (e.g., for variables 210) as context information 134 for the software objects 132 of the second subset 402. In an embodiment, controller 506 may provide the tags 220, the summaries 602-1, and the software objects 132 (e.g., source code 106) jointly or collectively, such as in a bundle or combined submission to code documentation generator 140. In another embodiment, controller 506 may first provide the software objects 132 of the second subset 402 to code documentation generator 140, and wait for one or more instructions 608 from code documentation generator 140. For example, code documentation generator 140 may query mediator 130 to provide a specific set of tags 220 based on what the code documentation generator 140 needs to complete the task. If/when code documentation generator 140 issues an instruction 608 (or series of instructions) for additional information regarding the software objects 132 of the second subset 402, controller 506 may provide the tags 220 and/or the summaries 602-1 in response to the instruction 608 (optional step 910 of FIG. 9).

In response to the submission by mediator 130, code documentation generator 140 generates summaries 602-2 for the software objects 132 of the second subset 402 based at least in part on the context information 134 provided by mediator 130. In FIG. 9, controller 506 receives the summaries 602-2 for the software objects 132 of the second subset 402 from code documentation generator 140 (step 706). Controller 506 may store the summaries 602-2 in local memory and/or in code repository 102. One technical benefit is the summaries 602-2 for the software objects 132 of the second subset 402 (e.g., functions 212) are automatically generated by code documentation generator 140, and may be used as content for the code documentation 110 of the codebase 104. Another technical benefit is mediator 130 provides context information 134 to code documentation generator 140 in the form of tags 220 and/or summaries 602-1 of lower-layer software objects 132 from a previous or prior phase 800 to improve accuracy of the summaries 602-2 for higher-layer software objects 132. As described above, the software objects 132 in the first higher layer 312 may have code dependencies with the software objects 132 of the lowest layer 311. Thus, by providing the previously-generated summaries 602-1 for the software objects 132 of the lowest layer 311 as context information 134 to code documentation generator 140, more accurate summaries 602-2 may be generated for the software objects 132 of the first higher layer 312.

Figure 10:
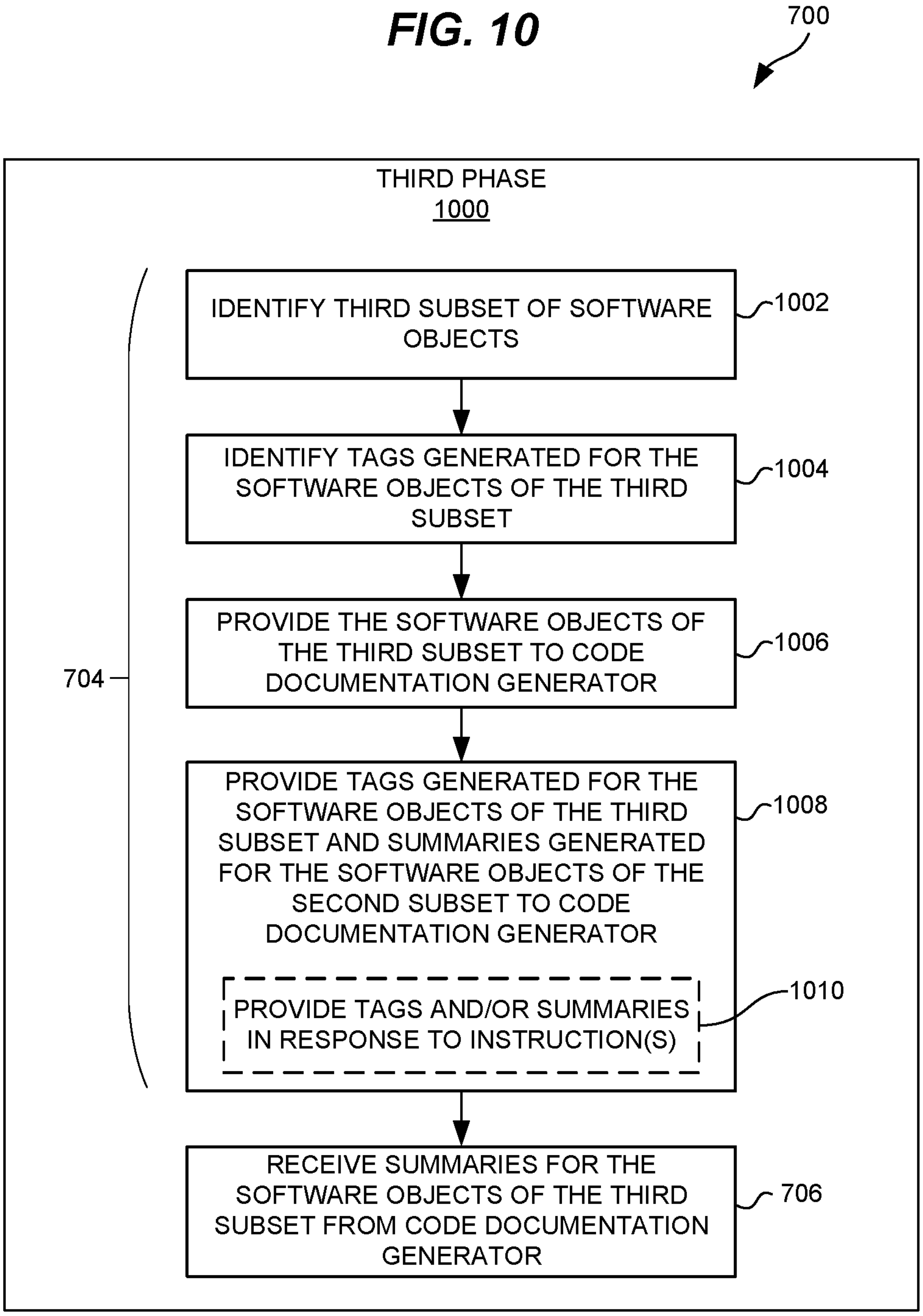
Figure 14:
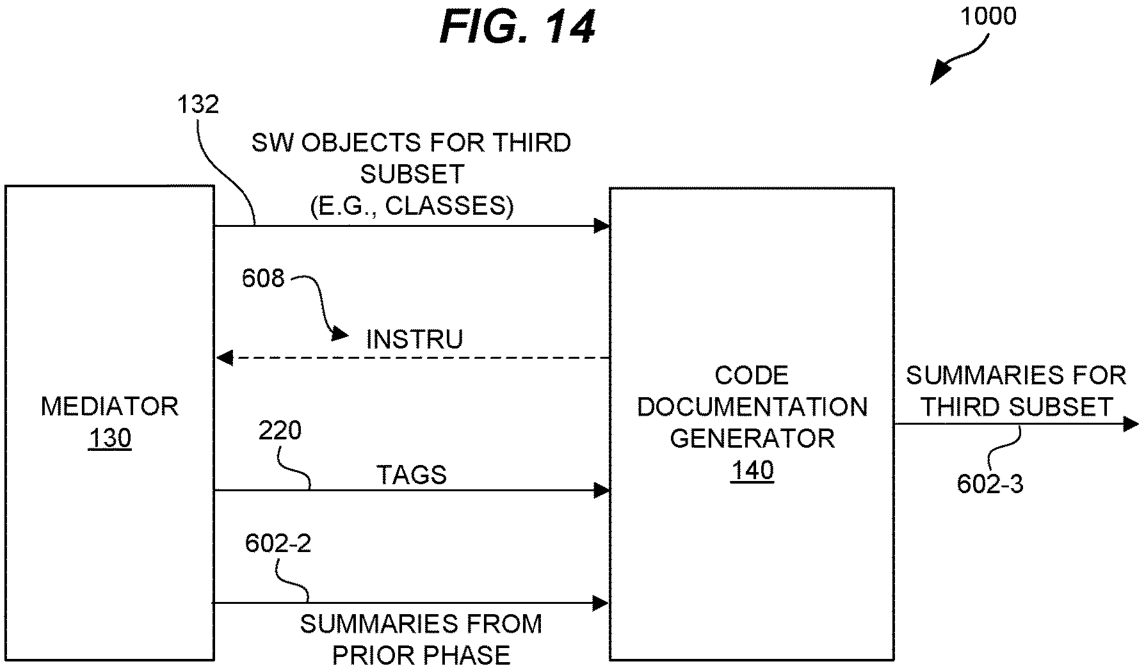
FIG. 14 is a block diagram illustrating data exchange between a mediator and a code documentation generator for the third phase in an illustrative embodiment.

FIG. 10 illustrates a third phase 1000, where controller 506 identifies (step 1002) a third subset 403 of software objects 132 associated with the second higher layer 313 of the hierarchical structure 300, associated with a third software object type 323, etc. For example, the software objects 132 of the third subset 403 may comprise classes 214 defined in codebase 104. Controller 506 also identifies tags 220 generated for the software objects 132 of the third subset 403 (step 1004). Controller 506 provides the software objects 132 of the third subset 403 to code documentation generator 140 (step 1006). For example, controller 506 sends, transfers, or otherwise provides the source code 106 for the software objects 132 of the third subset 403 to code documentation generator 140. Controller 506 may provide the source code 106 for individual software objects 132 of the third subset 403 to code documentation generator 140 (e.g., one at a time), may provide the source code 106 for a batch or batches of software objects 132, etc. FIG. 14 is a block diagram illustrating data exchange between mediator 130 and code documentation generator 140 for the third phase 1000 in an illustrative embodiment. In FIG. 14, mediator 130 provides the software objects 132 of the third subset 403 (e.g., classes 214) to code documentation generator 140.

In FIG. 10, controller 506 also provides context information 134 for one or more software objects 132 of the third subset 403 to code documentation generator 140. To do so, controller 506 provides the tags 220 generated for one or more of the software objects 132 of the third subset 403, and also provides the summaries 602-2 generated in a prior phase for one or more of the software objects 132 of the second subset 402, to code documentation generator 140 (step 1008). In FIG. 14, mediator 130 provides the tags 220 to code documentation generator 140 and summaries 602-2 (e.g., for functions 212) as context information 134 for the software objects 132 of the third subset 403. In an embodiment, controller 506 may provide the tags 220, the summaries 602-2, and the software objects 132 (e.g., source code 106) jointly or collectively, such as in a bundle or combined submission to code documentation generator 140. In another embodiment, controller 506 may first provide the software objects 132 of the third subset 403 to code documentation generator 140, and wait for one or more instructions 608 from code documentation generator 140. For example, code documentation generator 140 may query mediator 130 to provide a specific set of tags 220 based on what the code documentation generator 140 needs to complete the task. If/when code documentation generator 140 issues an instruction 608 (or series of instructions) for additional information regarding the software objects 132 of the third subset 403, controller 506 may provide the tags 220 and/or the summaries 602-2 in response to the instruction 608 (optional step 1010 of FIG. 10).

In response to the submission by mediator 130, code documentation generator 140 generates summaries 602-3 for the software objects 132 of the third subset 403 based at least in part on the context information 134 provided by mediator 130. In FIG. 10, controller 506 receives the summaries 602-3 for the software objects 132 of the third subset 403 from code documentation generator 140 (step 706). Controller 506 may store the summaries 602-3 in local memory and/or in code repository 102. One technical benefit is the summaries 602-3 for the software objects 132 of the third subset 403 (e.g., classes 214) are automatically generated by code documentation generator 140, and may be used as content for the code documentation 110 of the codebase 104. Another technical benefit is mediator 130 provides context information 134 to code documentation generator 140 in the form of tags 220 and/or summaries 602-2 of lower-layer software objects 132 from a previous or prior phase 900 to improve accuracy of the summaries 602-3 for higher-layer software objects 132. As described above, the software objects 132 in the second higher layer 313 may have code dependencies with the software objects 132 of the lowest layer 311 and/or the first higher layer 312. Thus, by providing the previously-generated summaries 602-2 for the software objects 132 of the first higher layer 312 as context information 134 to code documentation generator 140, more accurate summaries 602-3 may be generated for the software objects 132 of the second higher layer 313.

Figure 15:
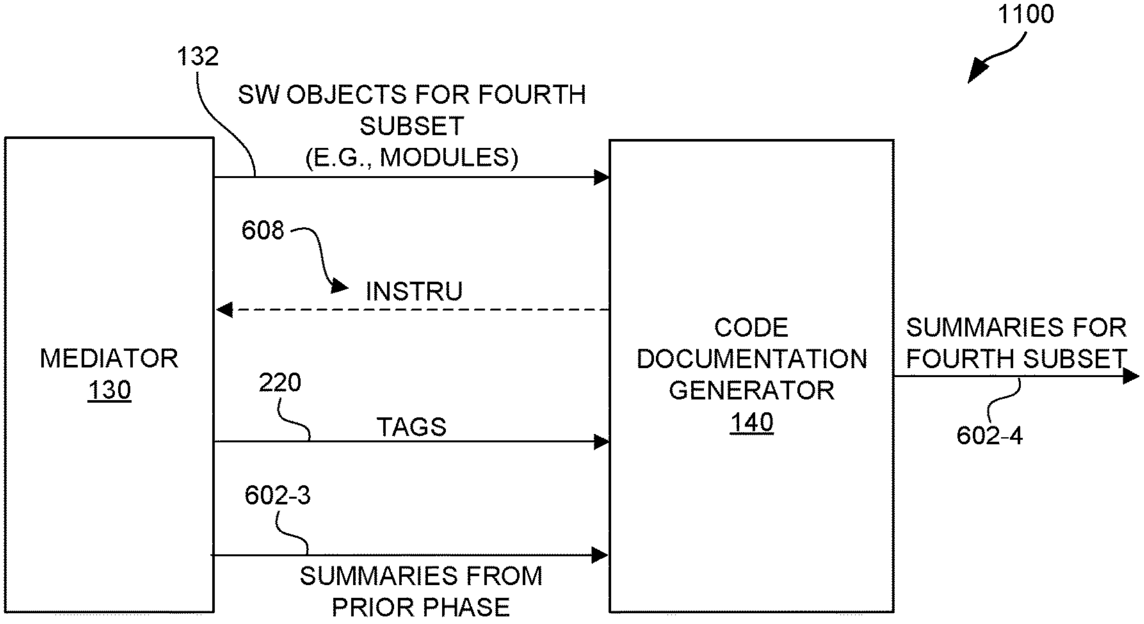
FIG. 15 is a block diagram illustrating data exchange between a mediator and a code documentation generator for the fourth phase in an illustrative embodiment.

FIG. 11 illustrates a fourth phase 1100, where controller 506 identifies (step 1102) a fourth subset 404 of software objects 132 associated with the third higher layer 314 of the hierarchical structure 300, associated with a fourth software object type 324, etc. For example, the software objects 132 of the fourth subset 404 may comprise modules 216, libraries 217, packages 218, etc., defined in codebase 104. Controller 506 also identifies tags 220 generated for the software objects 132 of the fourth subset 404 (step 1104). Controller 506 provides the software objects 132 of the fourth subset 404 to code documentation generator 140 (step 1106). For example, controller 506 sends, transfers, or otherwise provides the source code 106 for the software objects 132 of the fourth subset 404 to code documentation generator 140. Controller 506 may provide the source code 106 for individual software objects 132 of the fourth subset 404 to code documentation generator 140 (e.g., one at a time), may provide the source code 106 for a batch or batches of software objects 132, etc. FIG. 15 is a block diagram illustrating data exchange between mediator 130 and code documentation generator 140 for the fourth phase 1100 in an illustrative embodiment. In FIG. 15, mediator 130 provides the software objects 132 of the fourth subset 404 (e.g., modules 216) to code documentation generator 140.

In FIG. 11, controller 506 also provides context information 134 for one or more software objects 132 of the fourth subset 404 to code documentation generator 140. To do so, controller 506 provides the tags 220 generated for one or more of the software objects 132 of the fourth subset 404, and also provides the summaries 602-3 generated in a prior phase for one or more of the software objects 132 of the third subset 403, to code documentation generator 140 (step 1108). In FIG. 15, mediator 130 provides the tags 220 to code documentation generator 140 and summaries 602-3 (e.g., for classes 214) as context information 134 for the software objects 132 of the fourth subset 404. In an embodiment, controller 506 may provide the tags 220, the summaries 602-3, and the software objects 132 (e.g., source code 106) jointly or collectively, such as in a bundle or combined submission to code documentation generator 140. In another embodiment, controller 506 may first provide the software objects 132 of the fourth subset 404 to code documentation generator 140, and wait for one or more instructions 608 from code documentation generator 140. For example, code documentation generator 140 may query mediator 130 to provide a specific set of tags 220 based on what the code documentation generator 140 needs to complete the task. If/when code documentation generator 140 issues a instruction 608 (or series of instructions) for additional information regarding the software objects 132 of the fourth subset 404, controller 506 may provide the tags 220 and/or the summaries 602-3 in response to the instruction 608 (optional step 1110 of FIG. 11).

In response to the submission by mediator 130, code documentation generator 140 generates summaries 602-4 for the software objects 132 of the fourth subset 404 based at least in part on the context information 134 provided by mediator 130. In FIG. 11, controller 506 receives the summaries 602-4 for the software objects 132 of the fourth subset 404 from code documentation generator 140 (step 706). Controller 506 may store the summaries 602-4 in local memory and/or in code repository 102. One technical benefit is the summaries 602-4 for the software objects 132 of the fourth subset 404 (e.g., modules 216, libraries 217, packages 218, etc.) are automatically generated by code documentation generator 140, and may be used as content for the code documentation 110 of the codebase 104. Another technical benefit is mediator 130 provides context information 134 to code documentation generator 140 in the form of tags 220 and/or summaries 602-3 of lower-layer software objects 132 from a previous or prior phase 1000 to improve accuracy of the summaries 602-4 for higher-layer software objects 132. As described above, the software objects 132 in the third higher layer 314 may have code dependencies with the software objects 132 of the lowest layer 311, the first higher layer 312, and/or the second higher layer 313. Thus, by providing the previously-generated summaries 602-3 for the software objects 132 of the second higher layer 313 as context information 134 to code documentation generator 140, more accurate summaries 602-4 may be generated for the software objects 132 of the third higher layer 314.

Method 700 may include additional phases as described above based on the number of layers in the hierarchical structure 300 of codebase 104, the number of different software object types, etc. One technical benefit is the entire codebase 104 may be summarized at both a granular level and a high level. This process of summarizing the codebase 104 ensures that the summaries 602 are generated at the appropriate level of specificity for each software object 132 being considered.

Figure 16:
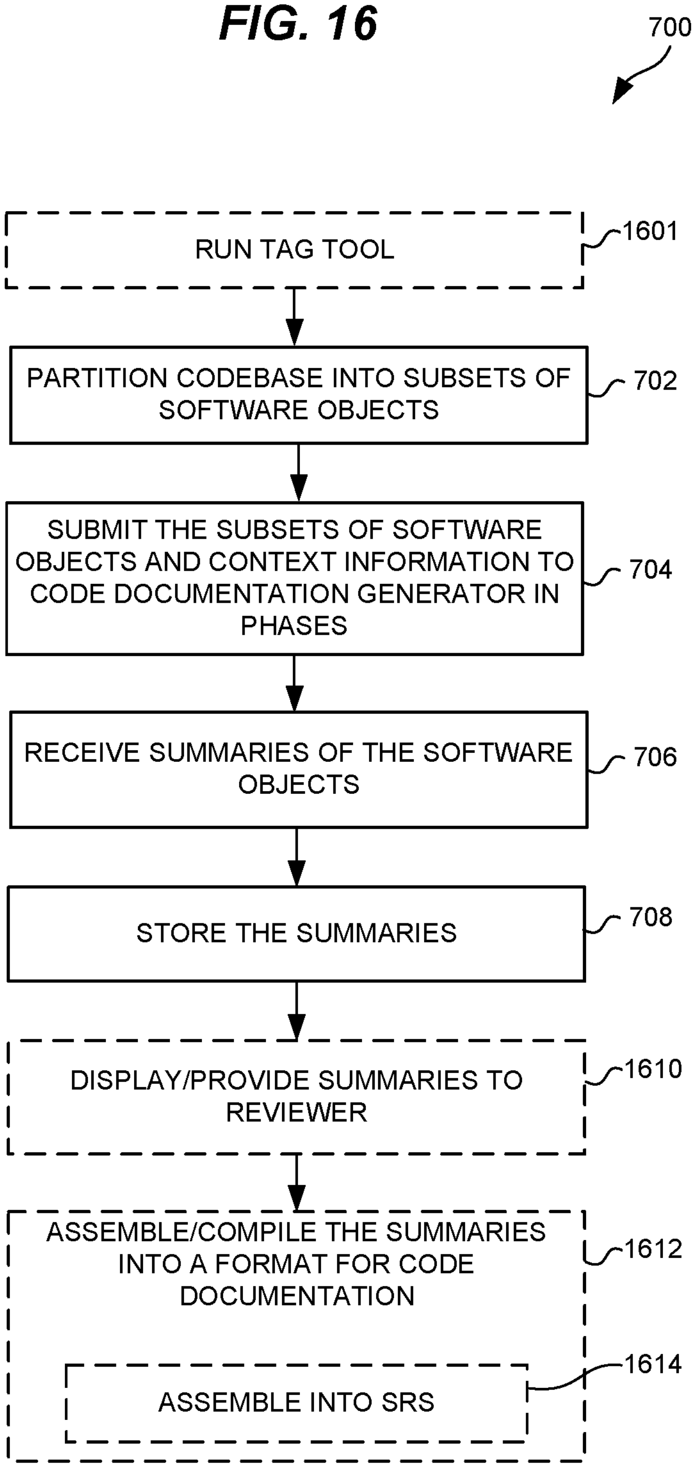
FIG. 16 is a flow chart illustrating further steps of the method in FIG. 7 in an illustrative embodiment.

After processing has been performed for each of the phases, mediator 130 may manipulate and/or display the summaries 602 as part of the automated code documentation. FIG. 16 is a flow chart illustrating further or additional steps of method 700 in an illustrative embodiment. In an embodiment, mediator 130 may display or otherwise provide the summaries 602 to a reviewer (optional step 1610), such as through GUI 505. The reviewer may review and/or modify the summaries 602 automatically generated by code documentation generator 140, and use the summaries 602 to formulate or compose the code documentation 110. One technical benefit is the reviewer can correct any inaccuracies in the summaries 602 automatically generated by code documentation generator 140. In an embodiment, mediator 130 may compile or assemble the summaries 602 into a format for the code documentation 110 (optional step 1612). For example, mediator 130 may compile or assemble the summaries 602 into a structured or standard format for code documentation 110 (optional step 1614), such as for a Software Requirements Specification (SRS). One technical benefit is the mediator 130 may automatically generate the code documentation 110 based on the summaries 602, which further automates the code documentation process. Mediator 130 may display or otherwise provide the code documentation 110 to a reviewer, such as through GUI 505, for further review.

As shown in FIG. 16, mediator 130 may run a tag tool 232 (e.g., Ctag tool 234) on codebase 104 to generate a tag file 250 comprising the tags 220 for the software objects 132 (optional step 1601).

Example

In the following example, additional processes, systems, and methods may be described in the context of code documentation. The processes, systems, and methods described in this example may be incorporated in embodiments described above as desired.

Figure 17:
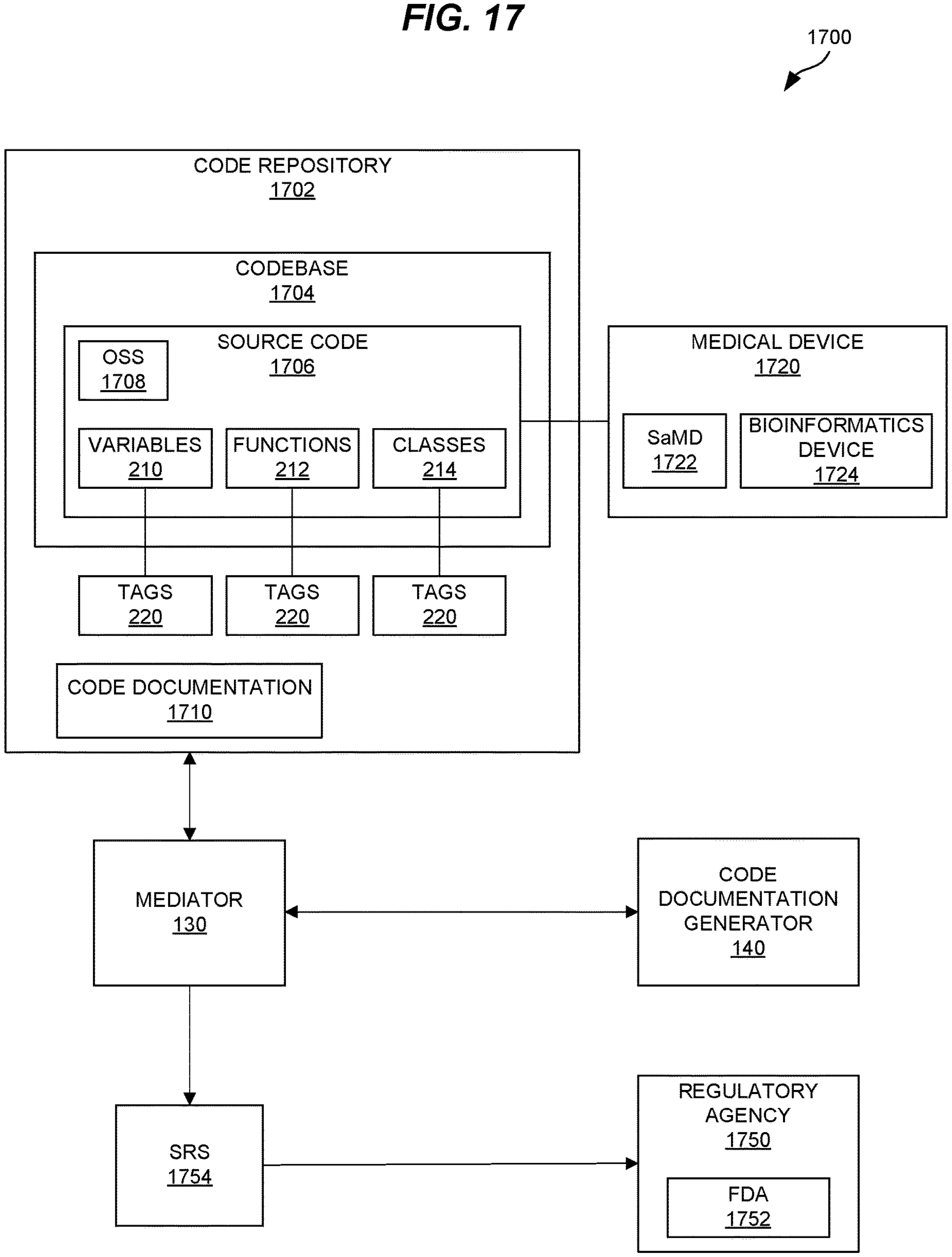
FIG. 17 is a block diagram of a code documentation architecture in another illustrative embodiment.

FIG. 17 is a block diagram of a code documentation architecture 1700 in another illustrative embodiment. As above, code documentation architecture 1700 comprises a collection of systems and/or components that provide an automated solution for generating code documentation 1710 for a codebase 1704. Codebase 1704 is stored in a code repository 1702, and comprises a complete body of source code 1706 for a software program, component, or system. In an embodiment, codebase 1704 may comprise or include Open Source Software (OSS) 1708 that is used or modified by programmers. As above, codebase 104 comprises a plurality of software objects 132 illustrated as variables 210, functions 212, and classes 214, although other software object types may be included.

In this example, codebase 1704 may be used in a regulated industry, such as the medical industry. For example, codebase 1704 may be written for a medical device 1720 or the like that is regulated by a regulatory agency 1750, such as the Food and Drug Administration (FDA) 1752. The regulatory agency 1750 may require that an entity submit documentation (e.g., code documentation 1710) regarding the medical device 1720 for approval. For example, the FDA 1752 requires a 510(k) submission for qualifying medical devices, which is a premarket submission demonstrating that a medical device is safe and effective. Part of a 510(k) submission may include a Software Requirements Specification (SRS) 1754. An SRS 1754 is a complete specification and description of requirements of the software that need to be fulfilled for the successful development of a software system, such as functional requirements, interface requirements, performance requirements (e.g., static and dynamic), design constraints, and/or other (non-functional) attributes. The code documentation 1710 generated by mediator 130 and code documentation generator 140 may be used to generate an SRS 1754, other documentation for a 510(k) submission, and/or other documentation for a regulatory agency 1750. One technical benefit is the codebase 1704 can be quite large making it impractical to document manually, and automated code documentation allows for the code documentation 1710 (e.g., an SRS 1754) to be generated quickly and efficiently. This may reduce the overall time spent creating an SRS 1754 or another submission to a regulatory agency 1750. Another technical benefit is automated code documentation may be used to efficiently update the code documentation 1710 as the codebase 1704 changes over time during development.

In an embodiment, mediator 130 is configured to index or tag the variables 210, functions 212, and classes 214 in codebase 1704. For example, mediator 130 may implement, command, or run a tag tool 232 (e.g., a Ctag tool 234) to generate tags 220 for the variables 210, functions 212, and classes 214 in codebase 1704.

In an embodiment, the software objects 132 of codebase 1704 may be classified or arranged as a layered or tiered hierarchy as described above. Mediator 130 is configured to partition, subdivide, or segment the codebase 1704 into subsets or groups of the software objects 132 based on the layered hierarchy. The lowest layer 311 of the hierarchy comprises variables 210, the first higher layer 312 of the hierarchy comprises functions 212, and the second higher layer 313 of the hierarchy comprises classes 214. Thus, mediator 130 partitions the codebase 1704 into variables 210, functions 212, and classes 214.

With the codebase 1704 partitioned, mediator 130 is configured to submit the variables 210, functions 212, and classes 214 to code documentation generator 140 in phases. For example, in a first phase, mediator 130 identifies the variables 210 defined in codebase 104. Mediator 130 also identifies tags 220 generated for the variables 210, and provides the variables 210 (e.g., source code 1706) and the tags 220 to code documentation generator 140. In response to the submission by mediator 130, code documentation generator 140 generates summaries 602 for the variables 210 that are received and stored by mediator 130.

In a second phase, mediator 130 identifies the functions 212 defined in codebase 104. Mediator 130 also identifies tags 220 generated for the functions 212, and provides the functions 212 (e.g., source code 1706), the tags 220, and the summaries 602 for the variables 210 to code documentation generator 140. In response to the submission by mediator 130, code documentation generator 140 generates summaries 602 for the functions 212 that are received and stored by mediator 130.

In a third phase, mediator 130 identifies the classes 214 defined in codebase 104. Mediator 130 also identifies tags 220 generated for the classes 214, and provides the classes 214 (e.g., source code 1706), the tags 220, and the summaries 602 for the functions 212 to code documentation generator 140. In response to the submission by mediator 130, code documentation generator 140 generates summaries 602 for the classes 214 that are received and stored by mediator 130.

The summaries 602 for the variables 210, functions 212, and classes 214 comprise content for the code documentation 1710. For example, mediator 130 may display or otherwise provide the summaries 602 to a reviewer, such as through GUI 505. The reviewer may review and/or modify the summaries 602 automatically generated by code documentation generator 140, and use the summaries 602 to formulate or compose the code documentation 1710. Mediator 130 may compile or assemble the summaries 602 into a format for the code documentation 1710, such as an SRS format. One technical benefit is the mediator 130 automates the code documentation process.

In an embodiment, medical device 1720 may comprise a Software as a Medical Device (SaMD) 1722. In another embodiment, medical device 1720 may comprise a bioinformatics device 1724. Bioinformatics is a scientific field related to the development or application of tools or applications to analyze and interpret biological data, such as DNA (deoxyribonucleic acid) sequences. In general, laboratory procedures related to genetics may include accessioning, sample plating, storage, extraction, library preparation, enrichment, and sequencing processes. These processes acquire genetic material from a sample, separate the genetic material from other constituents, duplicate the genetic material, and quantify the genetic material order to determine a swathe of sequence data, such as an exome or entire genome for a subject (e.g., a human, an animal, a pathogen, an organelle, etc.). Sequencing may be performed according to any of a variety of techniques, including short-read and long-read techniques. In one embodiment, the sequencing is performed as Sequencing by Synthesis (SBS) at genetic analyzer equipment. For example, sets of enriched libraries of genetic material bound to probes in earlier steps may be transferred to a flow cell, and annealed to oligonucleotide probes within the flow cell. At this stage, the contents of multiple wells may be applied to the same flow cell, because the libraries within those wells are tagged with the chemical identifiers. In one embodiment, the chemical identifiers comprise nucleotide sequences that are detectable during the sequencing process to determine a corresponding Laboratory Sample Identifier (LSI).

Complementary sequences may then be created via enzymatic extension to create a double-stranded portion of genetic material. The double-stranded genetic material may then be denatured, and the library fragment may be washed away. Bridge amplification may then be performed to create copies of the remaining molecule in a localized cluster. For example, a cluster may comprise twenty to fifty copies of the same molecule, localized to a location the size smaller than a pinhead on the flow cell.

Sequencing primers are annealed to library adapters in order to prepare the flow cell for SBS. During SBS, the sequencing primer uses reverse terminator fluorescent oligonucleotides, one base per cycle, for a number of cycles (e.g., one hundred and fifty cycles) in the forward direction. After the addition of each nucleotide, clusters are excited by a light source, resulting in fluorescence which can be measured. The emission wavelength and signal intensity for each cluster determines a base call for that cluster. Fluorescent moieties are then flushed from the flow cell. A chemical group blocking a 3' end of the fragment is then removed, enabling a subsequent nucleotide to be read. This tightly controls nucleotide addition and detection.

Base calls across cycles at the same physical location on the flow cell occur at the same cluster, and hence indicate sequential reads for copies of the same fragment of the genetic material. After each cycle, denaturing and annealing are performed to extend the index primer. A complementary reverse strand is created and extended via bridge amplification. The reverse strand is then read in the reverse direction for a number of cycles, in a manner similar to reads in the forward direction.

Depending on whether a complete human genome, or another set of genomic data, is being tested, different reagents (e.g., probes, primers, etc.) may be chosen. That is, different reagents may be utilized for library preparation for a pathogen (e.g., bacteria, virus) or an organelle (e.g., mitochondria) than for a human genome. Pathogens exhibiting Ribonucleic Acid (RNA) genomes may have their genetic material translated to DNA before sequencing, enrichment, and/or library preparation are performed, via known techniques, such as Next Generation Sequencing (NGS) techniques.

Throughout the processes discussed above, the laboratory environment may be carefully controlled to ensure quality. For example, temperature within each segment of the laboratory may be carefully monitored and controlled, and ultraviolet lighting or other features capable of inactivating genetic material may be carefully positioned to ensure that contamination does not occur.

In some embodiments, genetic material is used for detection of a pathogen rather than for sequencing. Detecting a pathogen may involve the use of a real-time Polymerase Chain Reaction (PCR) system that performs PCR. The real-time PCR system may further add a reactive agent to individual wells of a library preparation microplate, that fluoresces when bound to genetic material for the pathogen. By analyzing fluorescence at known periods of time after PCR has initiated, presence of a pathogen is determined. Genetic testing for a pathogen may thereby forego sequencing in some embodiments.

Raw sequence data generated during synthesis may be stored in a non-standard file format, such as Binary Base Call (BCL), depending on the sequencing equipment used. This raw data may be fed to an analytical pipeline, such as a cloud-based computing environment. Raw sequence data may be processed by the analytical pipeline into a second format, such as a text-based FASTQ format, that reports the sequence information (i.e., the sequence reads) and corresponding quality scores. The second format is then analyzed to perform alignment of sequence reads to a reference genome, such as a reference genome reported in a Browser Extensible Data (BED) file. The aligned sequence data may be reported as a Binary Alignment Map (BAM) file. The aligned sequence data may then be called, resulting in a Variant Call Format (VCF) file reporting called variants at each location of the genome that was sequenced, together with secondary metrics, such as quality indicator metrics.

The called sequence data may be provided to a data analyst via a User Interface (UI), such as a GUI presented via a display. The technician may then validate the resulting called sequence data and release it for reporting to subjects, health care providers, and/or scientists.

Although specific embodiments were described herein, the scope of the invention is not limited to those specific embodiments. The scope of the invention is defined by the following claims and any equivalents thereof.

What is claimed is:

1. An apparatus configured to facilitate automated code documentation of a codebase, the apparatus comprising:
- a mediator communicatively coupled to a code documentation generator;
- the mediator comprising a processor and memory, the processor configured to:
  - partition the codebase comprising a plurality of software objects into subsets according to a hierarchical structure where the software objects of higher layers have code dependencies with the software objects of lower layers;
  - submit the subsets of the software objects and context information for the software objects to the code documentation generator in phases starting with a lowest layer of the hierarchical structure;
  - receive summaries of the software objects from the code documentation generator in each of the phases; and
  - store the summaries as content for the code documentation;
  - wherein the context information for the software objects submitted in a phase comprises one or more tags generated for the software objects, and one or more of the summaries generated in a prior phase.

2. The apparatus of claim 1, wherein in a first phase, the processor is configured to:
- identify a first subset of the software objects associated with the lowest layer of the hierarchical structure;
- identify the tags generated for the software objects of the first subset;
- provide the software objects of the first subset to the code documentation generator;
- provide the tags generated for the software objects of the first subset to the code documentation generator; and
- receive the summaries for the software objects of the first subset from the code documentation generator.

3. The apparatus of claim 2, wherein in a second phase following the first phase, the processor is configured to:
- identify a second subset of the software objects associated with a first higher layer of the hierarchical structure, wherein one or more of the software objects associated with the first higher layer include code dependencies with one or more of the software objects associated with the lowest layer;

identify tags generated for the software objects of the second subset;

provide the software objects of the second subset to the code documentation generator;

provide the tags generated for the software objects of the second subset to the code documentation generator, and one or more of the summaries for the software objects of the first subset generated in the first phase; and receive the summaries for the software objects of the second subset from the code documentation generator.

4. The apparatus of claim 3, wherein in a third phase following the second phase, the processor is configured to:

identify a third subset of the software objects associated with a second higher layer of the hierarchical structure, wherein one or more of the software objects associated with the second higher layer include code dependencies with one or more of the software objects associated with the lowest layer and/or the first higher layer;

identify tags generated for the third subset of the software objects;

provide the software objects of the third subset to the code documentation generator;

provide the tags generated for the software objects of the third subset to the code documentation generator, and one or more of the summaries for the software objects of the second subset generated in the second phase; and receive the summaries for the software objects of the third subset from the code documentation generator.

5. The apparatus of claim 4, wherein:

the processor is configured to provide the context information for at least one of the first subset, the second subset, and the third subset in response to an instruction from the code documentation generator.

6. The apparatus of claim 4, wherein:

the software objects of the first subset comprise variables defined in the codebase;

the software objects of the second subset comprise functions defined in the codebase; and the software objects of the third subset comprise classes defined in the codebase.

7. The apparatus of claim 1, wherein:

the processor is configured to run a tag tool on the codebase to generate a tag file comprising the tags for the software objects.

8. The apparatus of claim 7, wherein:

the tag tool comprises a Ctag tool.

9. The apparatus of claim 1, wherein:

the processor is configured to assemble the summaries into a Software Requirements Specification (SRS).

10. The apparatus of claim 1, wherein:

the processor and the memory comprise processing resources and storage resources provisioned on a cloud computing platform.

11. A method of automatically documenting a codebase, the method comprising:

partitioning the codebase comprising a plurality of software objects into subsets according to a hierarchical structure where the software objects of higher layers have code dependencies with the software objects of lower layers;

submitting the subsets of the software objects and context information for the software objects to a code documentation generator in phases starting with a lowest layer of the hierarchical structure;

receiving summaries of the software objects from the code documentation generator in each of the phases; and storing the summaries as content for code documentation;

wherein the context information for the software objects submitted in a phase comprises one or more tags generated for the software objects, and one or more of the summaries generated in a prior phase.

12. The method of claim 11, wherein in a first phase:

the submitting comprises:

identifying a first subset of the software objects associated with the lowest layer of the hierarchical structure;

identifying the tags generated for the software objects of the first subset;

providing the software objects of the first subset to the code documentation generator; and providing the tags generated for the software objects of the first subset to the code documentation generator; and the receiving comprises receiving the summaries for the software objects of the first subset from the code documentation generator.

13. The method of claim 12, wherein in a second phase following the first phase:

the submitting comprises:

identifying a second subset of the software objects associated with a first higher layer of the hierarchical structure, wherein one or more of the software objects associated with the first higher layer include code dependencies with one or more of the software objects associated with the lowest layer;

identifying the tags generated for the software objects of the second subset;

providing the software objects of the second subset to the code documentation generator; and providing the tags generated for the software objects of the second subset to the code documentation generator, and one or more of the summaries for the software objects of the first subset generated in the first phase; and the receiving comprises receiving the summaries for the software objects of the second subset from the code documentation generator.

14. The method of claim 13, wherein in a third phase following the second phase:

the submitting comprises:

identifying a third subset of the software objects associated with a second higher layer of the hierarchical structure, wherein one or more of the software objects associated with the second higher layer include code dependencies with one or more of the software objects associated with the lowest layer and/or the first higher layer;

identifying the tags generated for the third subset of the software objects;

providing the software objects of the third subset to the code documentation generator; and providing the tags generated for the software objects of the third subset to the code documentation generator, and one or more of the summaries for the software objects of the second subset generated in the second phase; and the receiving comprises receiving the summaries for the software objects of the third subset from the code documentation generator.

15. The method of claim 14, wherein:

the software objects of the first subset comprise variables defined in the codebase;

the software objects of the second subset comprise functions defined in the codebase; and the software objects of the third subset comprise classes defined in the codebase.

16. The method of claim 11, further comprising:

running a tag tool on the codebase to generate a tag file comprising the tags for the software objects.

17. The method of claim 11, further comprising:

assembling the summaries into a Software Requirements Specification (SRS).

18. A non-transitory computer readable medium embodying programmed instructions executed by a processor, wherein the instructions direct the processor to implement a method of automatically documenting a codebase, the method comprising:

partitioning the codebase comprising a plurality of software objects into subsets according to a hierarchical structure where the software objects of higher layers have code dependencies with the software objects of lower layers;

submitting the subsets of the software objects and context information for the software objects to a code documentation generator in phases starting with a lowest layer of the hierarchical structure;

receiving summaries of the software objects from the code documentation generator in each of the phases; and storing the summaries as content for code documentation;

wherein the context information for the software objects submitted in a phase comprises one or more tags generated for the software objects, and one or more of the summaries generated in a prior phase.

19. The computer readable medium of claim 18, wherein the method further comprises:

running a tag tool on the codebase to generate a tag file comprising the tags for the software objects.

20. The computer readable medium of claim 18, wherein the method further comprises:

assembling the summaries into a Software Requirements Specification (SRS).

* * * * *